United States Patent
Kang

(10) Patent No.: US 10,521,000 B2
(45) Date of Patent: Dec. 31, 2019

(54) ELECTRONIC APPARATUS AND BATTERY INFORMATION PROVIDING METHOD THEREOF

(71) Applicant: Samsung Electronics Co., Ltd., Suwon-si, Gyeonggi-do (KR)

(72) Inventor: Tae-Jin Kang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/071,809

(22) Filed: Mar. 16, 2016

(65) Prior Publication Data

US 2016/0274637 A1 Sep. 22, 2016

(30) Foreign Application Priority Data

Mar. 19, 2015 (KR) .................. 10-2015-0038216

(51) Int. Cl.
| | |
|---|---|
| *G06F 1/28* | (2006.01) |
| *G06F 1/26* | (2006.01) |
| *G06F 1/3212* | (2019.01) |
| *G06F 1/3234* | (2019.01) |
| *G06F 9/4401* | (2018.01) |
| *G06F 11/30* | (2006.01) |
| *G06F 11/32* | (2006.01) |

(52) U.S. Cl.
CPC .............. *G06F 1/28* (2013.01); *G06F 1/26* (2013.01); *G06F 1/3212* (2013.01); *G06F 1/3234* (2013.01); *G06F 9/4406* (2013.01); *G06F 11/3058* (2013.01); *G06F 11/325* (2013.01); *Y02D 10/174* (2018.01)

(58) Field of Classification Search
None
See application file for complete search history.

(56) References Cited

U.S. PATENT DOCUMENTS 4,438,431 A * 3/1984 Toyomura ............... G06F 1/30
340/636.1
4,712,196 A 12/1987 Uesugi
(Continued)

FOREIGN PATENT DOCUMENTS

| CN | 1228540 A | 9/1999 |
|---|---|---|
| CN | 102819481 A | 12/2012 |

(Continued)

*Primary Examiner* — Kim Huynh
*Assistant Examiner* — Joshua Neveln
(74) *Attorney, Agent, or Firm* — Jefferson IP Law, LLP

(57) ABSTRACT

An electronic apparatus for providing battery information is provided. The electronic apparatus includes at least one battery, a processor supplied with power from the at least one battery that is configured to operate using the power and to control the electronic apparatus, a battery voltage determination unit connected to the at least one battery in parallel with the processor, and supplied with power directly from the at least one battery, the battery voltage determination configured to operate with the power, and to output a control signal when a voltage of the at least one battery satisfies a designated condition, and a battery information output unit configured to output battery information according to the control signal the is output by the battery voltage determination unit. Also, other embodiments may be implemented.

16 Claims, 13 Drawing Sheets

(56) References Cited

U.S. PATENT DOCUMENTS

| | | | |
|---|---|---|---|
| 2003/0227390 A1* | 12/2003 | Hung | G01R 31/3648 340/636.1 |
| 2009/0187678 A1 | 7/2009 | Itoh et al. | |
| 2010/0218021 A1* | 8/2010 | Ma | G06F 1/1684 713/323 |
| 2011/0216681 A1 | 9/2011 | Tao et al. | |
| 2012/0316811 A1 | 12/2012 | Choi et al. | |
| 2013/0076147 A1 | 3/2013 | Sun et al. | |
| 2013/0264994 A1 | 10/2013 | Schaefer | |
| 2015/0002160 A1 | 1/2015 | Lee et al. | |

FOREIGN PATENT DOCUMENTS

| | | |
|---|---|---|
| KR | 10-2006-0025845 A | 3/2006 |
| KR | 10-0686799 B1 | 2/2007 |
| KR | 10-2008-0024333 A | 3/2008 |
| KR | 10-2011-0020992 A | 3/2011 |
| KR | 10-1080731 B1 | 11/2011 |
| KR | 10-2012-0008477 A | 1/2012 |
| KR | 10-2012-0137071 A | 12/2012 |
| KR | 10-2013-0126918 A | 11/2013 |
| TW | 366106 U | 10/2009 |

\* cited by examiner

ELECTRONIC APPARATUS AND BATTERY INFORMATION PROVIDING METHOD THEREOF

CROSS-REFERENCE TO RELATED APPLICATION

This application claims the benefit under 35 U.S.C. § 119(a) of a Korean patent application filed on Mar. 19, 2015 in the Korean Intellectual Property Office and assigned Serial number 10-2015-0038216, the entire disclosure of which is hereby incorporated by reference.

TECHNICAL FIELD

The present disclosure relates to an electronic apparatus and a battery information providing method thereof.

BACKGROUND

The term "electronic apparatus" refers to an apparatus that performs a particular function according to an installed program, such as an electronic organizer, a portable multimedia player, a mobile communication terminal, a tablet personal computer (PC), an audio-visual apparatus, a desktop/laptop computer, a navigation for a motor vehicle, and the like, as well as household electrical appliances according to the related art. For example, such an electronic apparatus is capable of outputting the stored information, as a sound or an image. According to an increase in the degree of integration of such an electronic apparatus and the generalization of high-speed and high-capacity wireless communication, recently, one mobile communication terminal is equipped with various functions.

For example, an entertainment function such as a game, a multimedia function such as the reproduction of music/moving image, a communication and security function for mobile banking and the like, a function such as a schedule management, an electronic wallet, or the like, as well as a communication function, are being integrated into one electronic apparatus.

A portable electronic apparatus may be equipped with a battery as a means for supplying power. The battery may be released in a state of being fixed within the product, the electronic apparatus or in the form of being detachable/attachable from/to the main body of the electronic apparatus.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic apparatus and a battery information providing method thereof. In order to confirm a state or a residual quantity of a battery attached to an electronic apparatus, a user has inconvenience in that the user needs to turn on power of the electronic apparatus and boot the electronic apparatus, or needs to turn on a display unit (e.g., a liquid crystal display (LCD), a touch screen, or the like).

Various embodiments of the present disclosure may provide an electronic apparatus and a battery information providing method thereof which are capable of confirming a state or a residual quantity of a battery mounted on the electronic apparatus even when the electronic apparatus is in an off state, a standby state, or a warm booting state.

Also, various embodiments of the present disclosure may provide an electronic apparatus and a battery information providing method thereof which are capable of confirming a state or a residual quantity of a battery mounted on the electronic apparatus by using a communication processor (CP) even in a sleep mode state where an application processor (AP) that controls the electronic apparatus does not operate.

In accordance with an aspect of the present disclosure, an electronic apparatus is provided. The electronic apparatus includes at least one battery, a processor supplied with power from the at least one battery that is configured to operate using the power and to control the electronic apparatus, a battery voltage determination unit connected to the at least one battery in parallel with the processor, and supplied with power directly from the at least one battery, the battery voltage determination configured to operate using the power, and to output a control signal when a voltage of the at least one battery satisfies a designated condition, and a battery information output unit configured to output battery information according to the control signal the is output by the battery voltage determination unit.

In accordance with another aspect of the present disclosure, an operating method of an electronic apparatus in a method for providing battery information in the electronic apparatus is provided. The operating method includes determining whether an input of a preset key is performed, in a state where at least one battery is mounted on the electronic apparatus, determining whether a voltage of the at least one battery satisfies a designated condition, by a battery voltage determination unit connected to the at least one battery in parallel with a processor, supplied with power directly from the at least one battery, and operates using the power, when the input of the preset key is performed, and outputting state information of the at least one battery when the voltage of the at least one battery satisfies the designated condition.

In accordance with another aspect of the present disclosure, an operating method of an electronic apparatus in a method for providing battery information in the electronic apparatus is provided. The operating method includes receiving a booting request signal and booting the electronic apparatus, by an AP of the electronic apparatus, switching the AP to a sleep mode when the electronic apparatus satisfies a preset sleep mode switching condition, determining whether a signal is received from a communication processor, in a state of the sleep mode, determining whether a voltage of at least one battery satisfies a designated condition, by a battery voltage determination unit connected to the at least one battery in parallel with the processor, supplied with power directly from the at least one battery and operates using the power, when the signal is received from the communication processor, and outputting state information of the at least one battery when the voltage of the at least one battery satisfies the designated condition.

The electronic apparatus and the battery information providing method thereof, according to various embodiments of the present disclosure, enable a user to confirm a state or a residual quantity of the battery attached to the electronic apparatus without the need to turn on power of the electronic apparatus and boot the electronic apparatus, or the need to turn on a display (e.g., an LCD, a touch screen, or the like).

Also, the electronic apparatus and the battery information providing method thereof, according to various embodiments of the present disclosure, can confirm a state or a residual quantity of the battery mounted on the electronic apparatus even when the electronic apparatus is in an off state. Accordingly, the user can confirm the state or the residual quantity of the battery attached to the electronic apparatus without the need to press a power key of the electronic apparatus and wait until completion of booting of the electronic apparatus, or the need to turn on the display.

Also, the electronic apparatus and the battery information providing method thereof, according to various embodiments of the present disclosure, can confirm the state or the residual quantity of the battery mounted on the electronic apparatus by using the CP even in a sleep mode state where the AP that controls the electronic apparatus does not operate.

Further, the electronic apparatus and the battery information providing method thereof, according to various embodiments of the present disclosure, can confirm the state of the battery even without the need for the user to monitor a situation in which the battery attached to the electronic apparatus becomes a low-voltage state, and even without booting the electronic apparatus or operating the AP and the like, and thereby can reduce current consumption.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
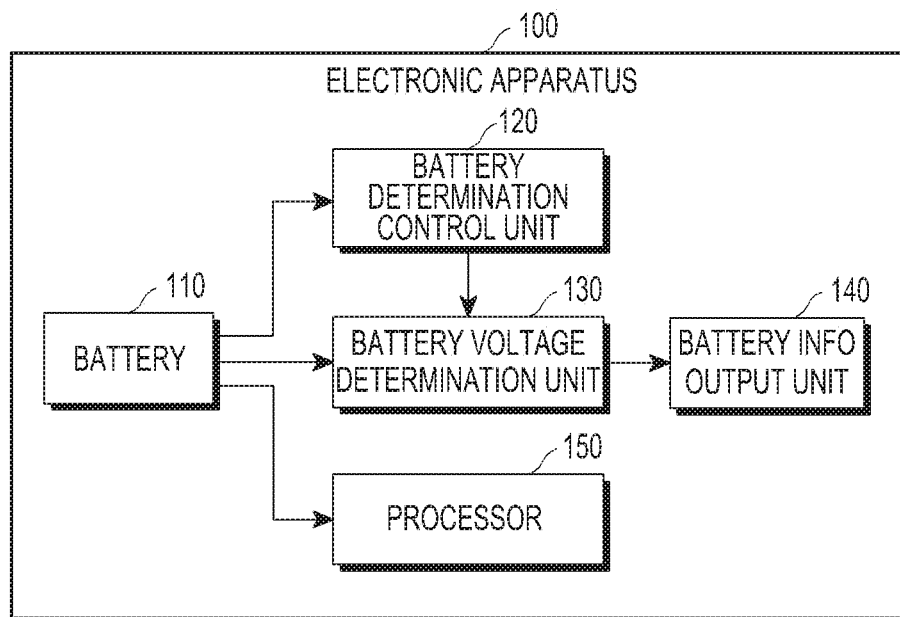
FIG. 1 is a block diagram illustrating an example of a configuration of an electronic apparatus according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. The above-described expressions may be used to distinguish an element from another element. For example, a first user device and a second user device may indicate different user devices irrespective of order or importance. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e g, third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured (or set) to" may not necessarily mean "specifically designed to" in hardware. Alternatively, in some situations, the expression "device configured to" may mean that the device, together with other devices or components, "is able to". For example, the text "processor configured (or set) to perform A, B, and C" may mean a dedicated processor (e.g., an embedded processor) for performing the corresponding operations, or a generic-purpose processor (e.g., a central processing unit (CPU) or an application processor (AP)) that can perform the corresponding operations by executing one or more software programs stored in a memory device.

The terms used in the present disclosure are only used to describe specific embodiments of the present disclosure, and are not intended to limit the present disclosure. Singular forms may include plural forms unless the context clearly indicates otherwise. Unless defined otherwise, all terms used herein, including technical and scientific terms, have the same meaning as those commonly understood by a person skilled in the art to which the present disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the term defined in the present disclosure should not be interpreted to exclude various embodiments of the present disclosure.

Electronic devices, according to various embodiments of the present disclosure, may include, for example, at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a Moving Picture Experts Group (MPEG-1 or MPEG-2) audio layer 3 (MP3) player, a mobile medical appliance, a camera, and a wearable device (e.g., smart glasses, a head-mounted device (HMD), electronic clothing, an electronic bracelet, an electronic necklace, an electronic appcessory, electronic tattoos, a smart mirror, or a smart watch).

In some embodiments of the present disclosure, an electronic device may be a smart home appliance. The smart home appliance may include, for example, at least one of a television (TV), a digital video disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic photo frame.

In an embodiment of the present disclosure, an electronic device may include at least one of various types of medical devices (e.g., various types of portable medical measurement devices (a blood-glucose measuring meter, a heart-rate measuring meter, a blood-pressure measuring meter, a body-temperature measuring meter, and the like), a magnetic resonance angiography (MRA), a MR imaging (MRI), a computed tomography (CT), a scanning machine, an ultrasonic machine, and the like), a navigation device, a global positioning system (GPS) receiver, an event data recorder (EDR), a flight DR (FDR), a vehicle infotainment device, electronic equipment for a vessel (e.g., a vessel navigation device, a gyro compass, and the like), avionics, a security device, a head unit for a vehicle, an industrial or home robot, an automatic teller's machine (ATM) of a financial institution, a point of sales (POS) of a store, and Internet of things (e.g., a light bulb, various types of sensors, an electric or gas meter, a sprinkler device, a fire alarm, a thermostat, a streetlamp, a toaster, exercise equipment, a hot-water tank, a heater, a boiler, etc.).

According to various embodiments of the present disclosure, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments of the present disclosure, an electronic device may be a combination of one or more of the aforementioned various devices. The electronic device according to various embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. The term "user" used in this specification may refer to a person or a device (e.g., an artificial intelligence electronic device) that uses an electronic device.

FIG. 1 is a block diagram illustrating an example of a configuration of an electronic apparatus according to various embodiments of the present disclosure.

Referring to FIG. 1, the electronic apparatus 100, according to various embodiments of the present disclosure, may include at least one of a battery 110, a battery determination control unit 120, a battery voltage determination unit 130, a battery information output unit 140, and a processor 150.

The battery 110 may supply power to each functional unit of the electronic apparatus 100. The battery 110 may be a disposable battery that does not have a charging function, or may be a rechargeable battery having charging and discharging functions. Also, the battery 110 may be configured to be fixed within the product at the time of manufacturing the electronic apparatus 100, may be configured to be attachable/detachable to/from the electronic apparatus 100, or may be configured to be replaceable by another battery. Alternatively, although one battery 110 is illustrated in FIG. 1, multiple batteries may be included in the electronic apparatus 100.

The battery 110 may supply power to the processor 150. For example, when a user presses a preset button (e.g., a power button) in an off state of the electronic apparatus 100 and turns on the electronic apparatus 100, power may be supplied to the processor 150, and a booting operation of the electronic apparatus 100 may be executed by the processor 150.

According to various embodiments of the present disclosure, the battery voltage determination unit 130 may be connected to the battery 110 in parallel with the processor 150. The battery voltage determination unit 130 may be connected to the battery 110 in parallel with the processor 150, and thus may operate regardless of an operation of the processor 150 or whether power is supplied to the processor 150.

According to various embodiments of the present disclosure, the battery voltage determination unit 130 may determine a voltage state of the battery 110 separately from an operation of the processor 150. For example, the battery voltage determination unit 130 may determine whether a voltage of the battery 110 is lower than or equal to a preset voltage, whether the voltage of the battery 110 exceeds the preset voltage, whether the voltage of the battery 110 is within a preset range, or whether the voltage of the battery 110 satisfies another preset condition.

For example, the battery voltage determination unit 130 may be configured as an electrical circuit or an electronic circuit that includes at least one element in order to determine the above-described various voltage conditions. For example, the battery voltage determination unit 130 may include at least one voltage control switching element (e.g., a transistor, a field effect transistor (FET), a junction FET (JFET), a metal-oxide semiconductor FET (MOSFET), etc.) that is turned on/off when a voltage satisfies a predetermined condition.

When the battery voltage determination unit 130 determines that the voltage of the battery 110 satisfies the preset condition, the battery voltage determination unit 130 may output a signal to the battery information output unit 140, or may cause a current to flow thereto.

The battery information output unit 140 may receive the signal or the current according to a result of the determination by the battery voltage determination unit 130, and may output information related to a state of the battery by using various methods. An information output method of the battery information output unit 140 may be variously implemented. For example, the battery information output unit 140 may output state information of the battery in the form of light-emitting, color, lighting, text, an image, or a combination thereof through an liquid crystal display (LCD), a light-emitting diode (LED), a touch screen, and the like. Alternatively, the battery information output unit 140 may output the state information of the battery in the form of a sound (e.g., a beep sound, a song, an effect sound, etc.), vibration, smell, and the like.

According to various embodiments of the present disclosure, the battery voltage determination unit 130 may be connected to the battery 110 in parallel with the processor 150, and may be directly connected to the battery 110 and may be supplied with power. Accordingly, the battery voltage determination unit 130 may independently operate regardless of whether the electronic apparatus 100 operates (e.g., whether the electronic apparatus 100 is in an on/off state, whether the electronic apparatus 100 is booted, an operation mode of the electronic apparatus 100, or the like).

According to various embodiments of the present disclosure, the battery voltage determination unit 130 may operate according to the control of the battery determination control unit 120. The battery determination control unit 120 may be supplied with power directly from the battery 110, and may be connected in parallel to the battery voltage determination unit 130 or the processor 150.

For example, when the user presses a particular button (e.g., in a state where power of the electronic apparatus 100 is turned off), the battery determination control unit 120 may deliver a control signal to the battery voltage determination unit 130. The battery determination control unit 120 may be configured as an electrical circuit or an electronic circuit including at least one element, in order to output control signals according to various conditions. For example, the battery determination control unit 120 may include at least one voltage control switching element (e.g., a transistor, an FET, a JFET, a MOSFET, etc.) that is turned on/off when a preset condition is satisfied (e.g., when the user presses a particular button, in each preset time cycle, when a preset event occurs, etc.).

When the battery determination control unit 120 determines that a voltage of the battery 110 satisfies a preset condition, the battery determination control unit 120 may output a signal or may cause a current to flow through the battery voltage determination unit 130 or the battery information output unit 140.

As illustrated in FIG. 1, the battery voltage determination unit 130 may be supplied with power directly from the battery 110, and may operate regardless of an operation of the processor 150. Accordingly, although the electronic apparatus 100 is in an off state, the electronic apparatus 100 is in a state before being booted, the electronic apparatus 100 is in a warm booting state, or the processor 150 is in a state of being temporarily switched to a sleep mode state or a standby state, the battery voltage determination unit 130 may determine a voltage state of the battery 110, and may output a control signal or control information, which corresponds to a result of the determination, to the battery information output unit 140.

The processor 150 may include one or more of a CPU, an AP, a communication processor (CP), and an embedded processor. The processor 150 may perform, for example, an arithmetic operation or data processing on control and/or communication of at least one of the other elements of the electronic apparatus 100.

Figure 2:
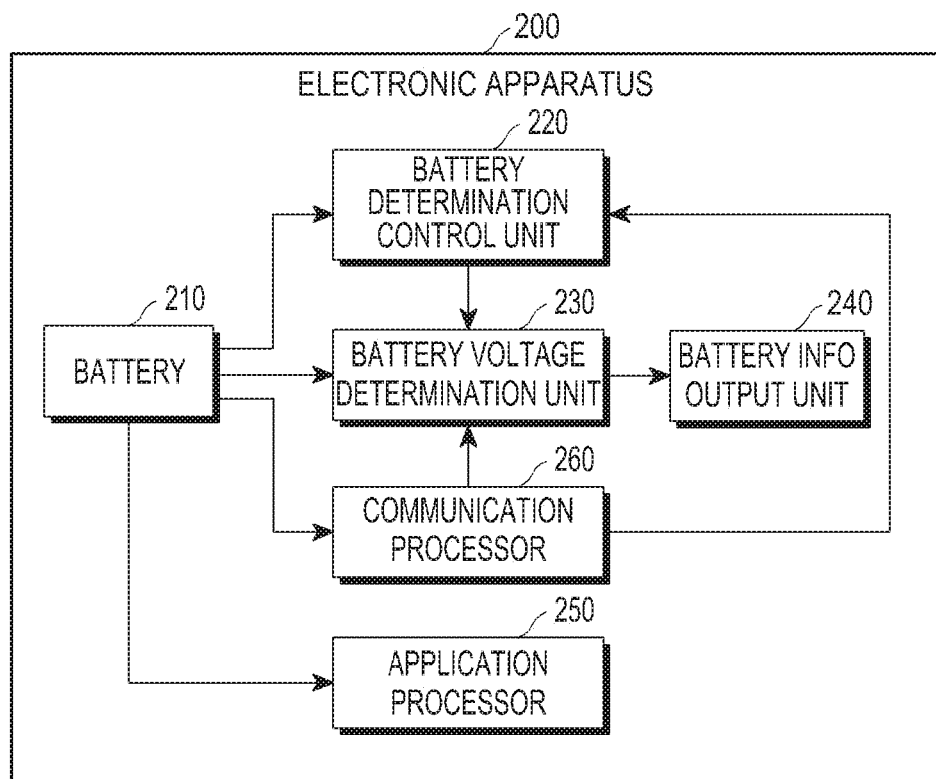
FIG. 2 is a block diagram illustrating an example of a configuration of an electronic apparatus according to various embodiments of the present disclosure.

FIG. 2 is a block diagram illustrating an example of a configuration of an electronic apparatus according to various embodiments of the present disclosure.

Referring to FIG. 2, the electronic apparatus 200, according to various embodiments of the present disclosure, may include at least one of a battery 210, a battery determination control unit 220, a battery voltage determination unit 230, a battery information output unit 240, an AP 250, and a CP 260.

The battery 210 may supply power to each functional unit of the electronic apparatus 200. The battery 210 may be a disposable battery that does not have a charging function, or may be a rechargeable battery having charging and discharging functions. Also, the battery 210 may be configured to be fixed within the product at the time of manufacturing the electronic apparatus 200, may be configured to be attachable/detachable to/from the electronic apparatus 200, or may be configured to be replaceable by another battery.

The battery 210 may supply power to the AP 250 or the CP 260. For example, when a user presses a preset button (e.g., a power button) in a state where power of the electronic apparatus 200 is turned off and turns on the electronic apparatus 200, power may be supplied to the AP 250, and a booting operation of the electronic apparatus 200 may be executed by the AP 250.

According to various embodiments of the present disclosure, the battery voltage determination unit 230 may be connected to the battery 210 in parallel with the AP 250. The battery voltage determination unit 230 may be connected to the battery 210 in parallel with the AP 250, and thus may operate regardless of an operation of the AP 250 or whether power is supplied to the AP 250.

The battery voltage determination unit 230 may determine a voltage state of the battery 210 separately from an operation of the AP 250. For example, the battery voltage determination unit 230 may determine whether a voltage of the battery 210 is lower than or equal to a preset voltage, whether the voltage of the battery 210 exceeds the preset voltage, whether the voltage of the battery 210 is within a preset range, or whether the voltage of the battery 210 satisfies another preset condition.

For example, the battery voltage determination unit 230 may be configured as an electrical circuit or an electronic circuit that includes at least one element in order to determine the above-described various voltage conditions. For example, the battery voltage determination unit 230 may include at least one voltage control switching element (e.g., a transistor, a FET, a JFET, a MOSFET, etc.) that is turned on/off when a voltage satisfies a predetermined condition.

When the battery voltage determination unit 230 determines that the voltage of the battery 210 satisfies the preset condition, the battery voltage determination unit 230 may output a signal to the battery information output unit 240, or may cause a current to flow thereto.

The battery information output unit 240 may receive the signal or the current according to a result of the determination by the battery voltage determination unit 230, and may output information related to a state of the battery by using various methods. An information output method of the battery information output unit 240 may be variously implemented. For example, the battery information output unit 240 may output state information of the battery in the form of light-emitting, color, lighting, text, an image, or a combination thereof through an LCD, an LED, a touch screen, and the like. Alternatively, the battery information output unit 240 may output the state information of the battery in the form of a sound (e.g., a beep sound, a song, an effect sound, etc.), vibration, smell, and the like.

According to various embodiments of the present disclosure, the battery voltage determination unit 230 may be connected to the battery 210 in parallel with the AP 250, and may be directly connected to the battery 210 and may be supplied with power. Accordingly, the battery voltage determination unit 230 may independently operate regardless of whether the electronic apparatus 200 operates (e.g., whether the electronic apparatus 200 is in an on/off state or whether the electronic apparatus 200 is booted).

According to various embodiments of the present disclosure, the battery voltage determination unit 230 may operate according to the control of the battery determination control unit 220. The battery determination control unit 220 may be supplied with power directly from the battery 210, and may be connected in parallel to the battery voltage determination unit 230 or the AP 250.

For example, when the user presses a particular button (e.g., in a state where power of the electronic apparatus 200 is turned off), the battery determination control unit 220 may deliver a control signal to the battery voltage determination unit 230. The battery determination control unit 220 may be configured as an electrical circuit or an electronic circuit including at least one element, in order to output control signals according to various conditions. For example, the battery determination control unit 220 may include at least one voltage control switching element (e.g., a transistor, an FET, a JFET, a MOSFET, etc.) that is turned on/off when a preset condition is satisfied (e.g., when the user presses a particular button, in each preset time cycle, when a preset event occurs, etc.).

Also, according to various embodiments of the present disclosure, the battery determination control unit 220 may receive a control signal from the CP 260, and may operate according to the received control signal. For example, when the electronic apparatus 200 is booted and then the AP 250 is switched to a sleep mode state or a standby mode state, the AP 250 does not operate temporarily, periodically, or during a time period satisfying a preset condition, but the CP 260 may perform a communication-related operation regardless of whether the AP 250 operates. For example, the CP 260 may periodically wake up and may process a received signal through a wired/wireless interface, or may transmit a signal through the wired/wireless interface.

According to various embodiments of the present disclosure, the CP 260 may periodically operate in a state where the AP 250 is in the sleep mode, and the CP 260 may provide a control signal to the battery determination control unit 220 or the battery voltage determination unit 230 when the CP 260 operates.

The battery determination control unit 220 may output a control signal so that the battery voltage determination unit 230 may operate whenever the CP 260 operates. Also, the battery voltage determination unit 230 may receive a control signal from the CP 260 or the battery determination control unit 220 whenever the CP 260 operates, and may determine whether the voltage of the battery 210 satisfies the preset condition.

When the battery determination control unit 220 determines that a voltage of the battery 210 satisfies a preset condition, the battery determination control unit 220 may output a signal or may cause a current to flow through the battery voltage determination unit 230 or the battery information output unit 240.

As illustrated in FIG. 2, the battery voltage determination unit 230 may be supplied with power directly from the battery 210, and may operate regardless of an operation of the AP 250. Accordingly, although the electronic apparatus 200 is in an off state, the electronic apparatus 200 is in a state before being booted, the electronic apparatus 200 is in a warm booting state, or the AP 250 is in a state of being temporarily switched to a sleep mode state or a standby state, the battery voltage determination unit 230 may determine a voltage state of the battery 210 according to, for example, an operation of the CP 260, and may output a signal, which corresponds to a result of the determination, to the battery information output unit 240.

The AP 250 may control multiple hardware or software elements connected to the AP 250 by running, for example, an operation system (OS) or an application program, and may perform the processing of and arithmetic operations on various data. The AP 250 may be implemented by, for example, a system on chip (SoC). According to an embodiment of the present disclosure, the AP 250 may further include a graphical processing unit (GPU) and/or an image signal processor. The AP 250 may load, into a volatile memory, instructions or data received from at least one (e.g., a non-volatile memory) of the other elements and may process the loaded instructions or data, and may store various data in a non-volatile memory.

The CP 260 may include at least one of, for example, a cellular module, a Wi-Fi module, a Bluetooth (BT) module, a GPS module, a near field communication (NFC) module, and a radio frequency (RF) module.

For example, the cellular module may provide a voice call, an image call, a text message service, an Internet service, and the like through a communication network. According to an embodiment of the present disclosure, the cellular module may identify and authenticate an electronic apparatus 200 in the communication network by using the subscriber identification module (e.g., a subscriber identity module (SIM) card). According to an embodiment of the present disclosure, the cellular module may perform at least some of the functions that the AP 250 may provide.

Each of the Wi-Fi module, the BT module, the GPS module, and the NFC module may include, for example, a processor for processing data transmitted and received through the relevant module. According to some embodiments of the present disclosure, at least some (e.g., two or more) of the cellular module, the Wi-Fi module, the BT module, the GPS module, and the NFC module may be included in one integrated chip (IC) or IC package.

The RF module may transmit and receive, for example, communication signals (e.g., RF signals). The RF module may include, for example, a transceiver, a power amplifier module (PAM), a frequency filter, a low noise amplifier (LNA), and an antenna. According to another embodiment of the present disclosure, at least one of the cellular module, the Wi-Fi module, the BT module, the GPS module, and the NFC module may transmit and receive RF signals through a separate RF module.

Figure 3:
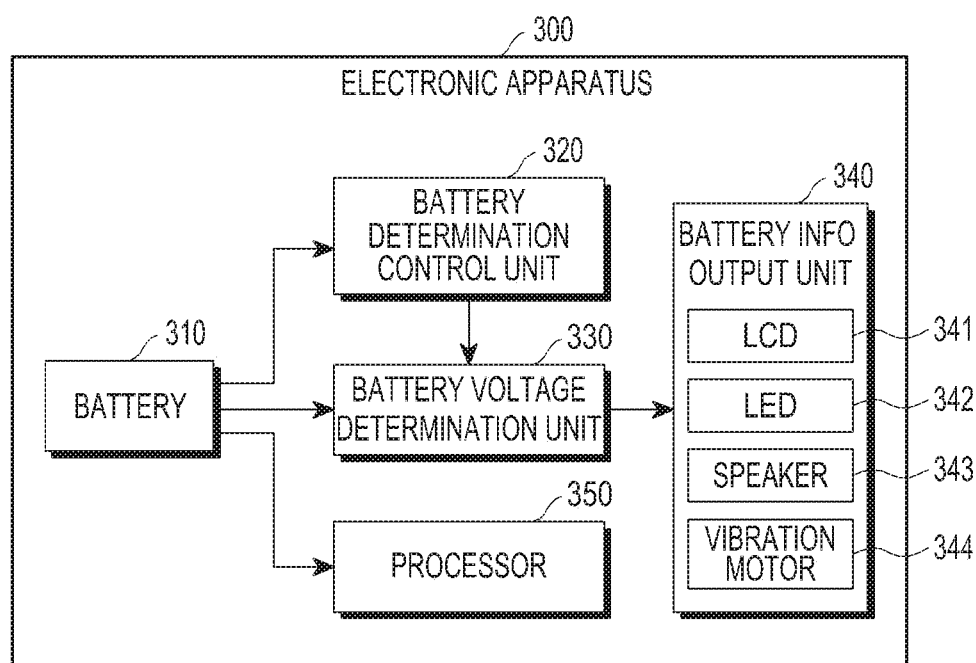
FIG. 3 is a block diagram illustrating an example of a configuration of an electronic apparatus according to various embodiments of the present disclosure.

FIG. 3 is a block diagram illustrating an example of a configuration of an electronic apparatus according to various embodiments of the present disclosure. Referring to FIG. 3, the electronic apparatus 300, according to various embodiments of the present disclosure, may include at least one of a battery 310, a battery determination control unit 320, a battery voltage determination unit 330, a battery information output unit 340, and a processor 350.

Some of the respective units illustrated in FIG. 3 may perform functions which are identical or similar to those of the units illustrated in FIG. 1, and thus a description of detailed operations of the respective units illustrated in FIG. 3 will be omitted.

According to various embodiments of the present disclosure, the battery information output unit 340 may include at least one of an LCD 341, an LED 342, a speaker 343, and a vibration motor 344.

For example, when a voltage of the battery 310 is lower than or equal to a predetermined level, a signal may be provided from the battery voltage determination unit 330 to the battery information output unit 340 according to a control signal from the battery determination control unit 320. Information may be output which corresponds to a signal which is output through at least one of the LCD 341, the LED 342, the speaker 343, and the vibration motor 344 according to the signal which has been output from the battery voltage determination unit 330.

For example, when the voltage of the battery 310 is lower than or equal to the predetermined level (e.g., 3.7 V), the battery voltage determination unit 330 may provide a low voltage signal to the battery information output unit 340. The LCD 341 or the touch screen of the battery information output unit 340 may display a current low-voltage state of the battery 310, as an image (e.g., an image illustrated in FIG. 12) and the like on the screen.

Also, according to various embodiments of the present disclosure, when the voltage of the battery 310 is lower than or equal to the predetermined level (e.g., 3.7 V), the LED 342 of the battery information output unit 340 may light an LED having a preset color. The lighting may be implemented to be repeated in a predetermined time cycle, or may be implemented to be lighted in a predetermined pattern.

For example, the electronic apparatus 300 may be provided with the LED 342 as a state indicator at a particular position of the front surface, the lateral surface, or the rear surface thereof, and the LED 342 may display a state of the electronic apparatus 300 in various methods. The LED 342 may be displayed in the form shown in Table 1 below according to each state of the electronic apparatus 300.

TABLE 1

| Event | Color | Blinking pattern |
| --- | --- | --- |
| During charging | Red | Maintain on-state |
| Completion of charging | Green | Maintain on-state |
| Low battery level | Red | 5,000 ms off → 500 ms on |
| Charging error | Red | 500 ms off → 500 ms on |
| Non-reception notification | Blue | 5,000 ms off → 500 ms on |
| Voice recording | Blue | 500 ms off → 500 ms on |

Referring to Table 1, when a voltage level of the battery 310 attached to the electronic apparatus 300 is a low level which is lower than or equal to a preset level (e.g., 15%, 3.7 V, or the like), a red LED may be lit in a predetermined cycle. For example, an operation may be repeated in which an LED is turned off during a time period of 5,000 ms and is then lit in red color during a time period of 500 ms. Accordingly, when the LED 342 is lit in red color at regular intervals, a user may recognize that the electronic apparatus 300 needs to be charged. At this time, a state in which the LED 342 is periodically lit in red color may be continuously maintained until a charging cable is connected to the electronic apparatus 300 and the electronic apparatus 300 begins to be charged, or until other events (e.g., the non-reception of text, the non-termination of a telephone call, etc.) occur.

As described above, the LED 342 may display various states of the electronic apparatus 300 or various states of the battery 310 in lighting color, in a lighting pattern, or in a combination thereof. Meanwhile, an example of state display of the LED 342 may be variously modified, and embodiments of the present disclosure are not limited to the above-described method. Also, although events of six types are distinguished from each other and shown according to the state of the electronic apparatus 300 in Table 1, methods for configurations, such as types of events for state display, the number thereof, classification thereof, and the like, may be variously selected and modified.

Also, according to various embodiments of the present disclosure, when the voltage of the battery 310 is lower than or equal to the predetermined level (e.g., 3.7 V), the speaker 343 of the battery information output unit 340 may output a preset beep sound, a preset song, a preset effect sound, and the like.

Further, according to various embodiments of the present disclosure, when the voltage of the battery 310 is lower than or equal to the predetermined level (e.g., 3.7 V), the vibration motor 344 of the battery information output unit 340 may vibrate under a condition, such as a preset vibration cycle, a preset vibration strength, and the like, and thereby may output state information of the battery 310.

According to various embodiments of the present disclosure, the battery information output unit 340 may independently output information according to a control signal of the battery voltage determination unit 330 regardless of whether the processor 350 operates, and may output information according to the control of the processor 350.

In various embodiments of the present disclosure, the term "each functional unit" or "each module" may refer to a functional and structural combination of software for driving hardware and software for implementing the technical idea of various embodiments of the present disclosure. Those having ordinary knowledge in the technical field of embodiments of the present disclosure will easily infer that the term "each functional unit" or "each module" may refer to, for example, a predetermined code and a logical unit of hardware resources which allow the predetermined code to be performed, and neither necessarily refers to a physically-connected code nor refers to a kind of hardware.

An electronic apparatus, according to one of various embodiments of the present disclosure, may include at least one battery, a processor supplied with power from the at least one battery that is configured to operate using the power and to control the electronic apparatus, a battery voltage determination unit connected to the at least one battery in parallel with the processor, and supplied with power directly from the at least one battery, the battery voltage determination configured to operate with the power, and to output a control signal when a voltage of the at least one battery satisfies a designated condition, and a battery information output unit configured to output battery information according to the control signal the is output by the battery voltage determination unit.

According to various embodiments of the present disclosure, the electronic apparatus may further include a battery determination control unit connected to the at least one battery in parallel with the processor, and supplied with power directly from the at least one battery, the battery determination control unit configured to operate using the power, and output a control signal for driving the at least one battery voltage determination unit according to the input of a preset signal.

According to various embodiments of the present disclosure, the battery determination control unit may be configured to receive a signal according to an input of at least one key provided outside the electronic apparatus and to output a control signal.

According to various embodiments of the present disclosure, the key provided outside the electronic apparatus may be a power key configured to turn on power of the electronic apparatus.

According to various embodiments of the present disclosure, the battery determination control unit may include at least one switching element configured to be switched to an on state according to the input of the preset signal.

According to various embodiments of the present disclosure, the battery determination control unit may be configured to receive, as an input, a signal received from a CP in a state where an AP of the electronic apparatus is in a sleep mode, and to output a control signal.

According to various embodiments of the present disclosure, the battery voltage determination unit may include at least one switching element configured to be switched to an on state when the at least one battery satisfies a preset voltage condition.

According to various embodiments of the present disclosure, the preset voltage condition may be a condition in which the at least one battery has a voltage level lower than or equal to a preset voltage level.

According to various embodiments of the present disclosure, the battery voltage determination unit may include multiple switching elements that are connected in parallel to the at least one battery, and at least one of the multiple switching elements may be configured to be switched to an on state, according to multiple voltage conditions.

According to various embodiments of the present disclosure, the battery information output unit may include at least one of an LCD, an LED, a touch screen, a speaker, and a vibration element.

Hereinafter, referring to FIGS. 4 to 7, a description will be described in detail of examples of implementations of circuits of the battery determination control units 120, 220 and 320, the battery voltage determination units 130, 230 and 330, and the battery information output units 140, 240 and 340.

Figure 4:
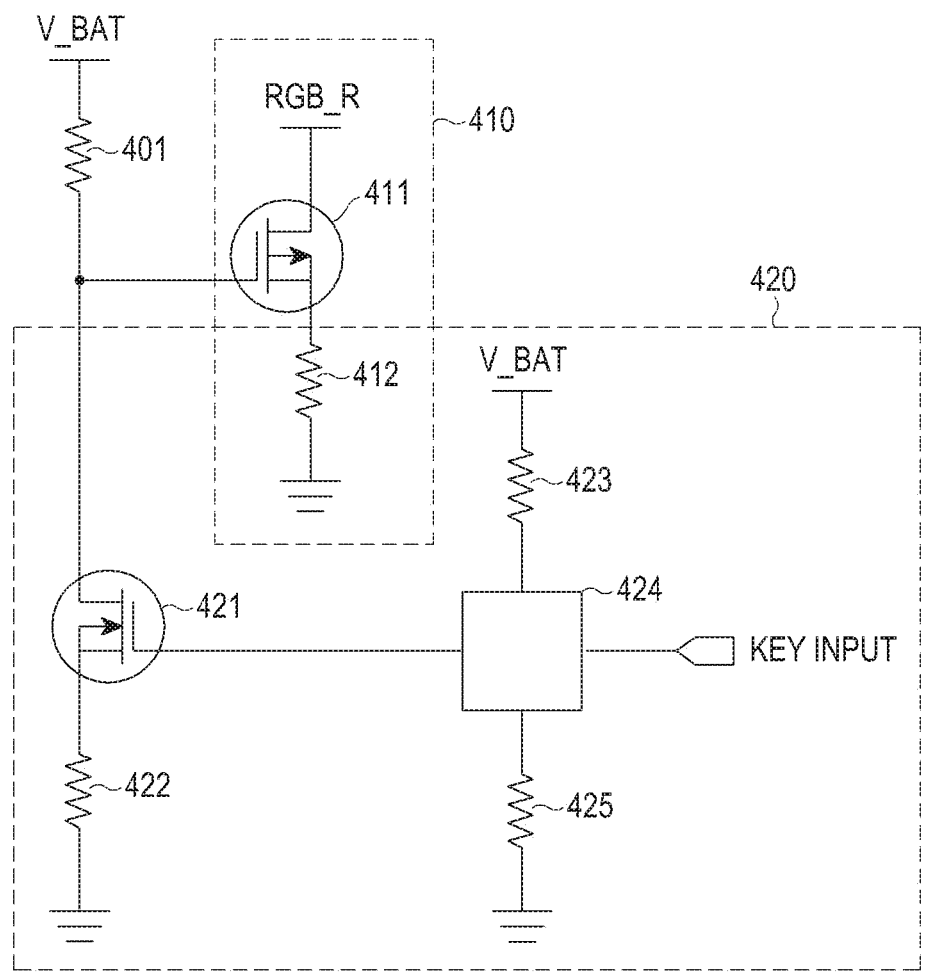
FIG. 4 is a view illustrating a battery information output circuit of an electronic apparatus according to various embodiments of the present disclosure.

FIG. 4 is a view illustrating a battery information output circuit of an electronic apparatus according to various embodiments of the present disclosure. The battery information output circuit illustrated in FIG. 4 may configure at least part of each of the electronic apparatuses described in detail with reference to FIGS. 1 to 3.

Referring to FIG. 4, the battery information output circuit, according to various embodiments of the present disclosure, may include at least one of a first switching unit 411, a second switching unit 421, a first resistor 401, a second resistor 412, a third resistor 422, a fourth resistor 423, a fifth resistor 425, and a control circuit unit 424. The first switching unit 411 and the second switching unit 421 form a battery voltage determination unit 410, and may correspond to each of the battery voltage determination units 130, 230, and 330 illustrated in FIGS. 1 to 3. Also, the second switching unit 421, the control circuit unit 424, the third resistor 422, the fourth resistor 423, and the fifth resistor 425 form a battery determination control unit 420, and may correspond to each of the battery determination control units 120, 220, and 320 illustrated in FIGS. 1 to 3.

The first switching unit 411 and the second switching unit 421 may be implemented by any circuit element capable of being switched by using a voltage level as a control signal. In FIG. 4, a switching unit is implemented by, for example, a MOSFET.

When the second switching unit 421 is in an on state in a state where a battery is mounted on the electronic apparatus, a battery voltage V_BAT may be applied to a gate terminal of the first switching unit 411 through the first resistor 401. A voltage applied to the gate terminal of the first switching unit 411 may be determined by the first resistor 401 and the third resistor 422.

According to various embodiments of the present disclosure, when a key input KEY INPUT is applied to the control circuit unit 424 of the battery determination control unit 420, the control circuit unit 424 may be driven by the battery voltage V_BAT, and may provide a gate terminal of the second switching unit 421 with a current for turning on the second switching unit 421. The key input may be implemented to be input to the control circuit unit 424 when a user presses a preset button (e.g., a power button, a home button, or the like of the electronic apparatus), or when the user presses the preset button during a preset time period or longer.

When the control circuit unit 424 provides the current to the gate terminal of the second switching unit 421 according to the application of the key input, the second switching unit 421 may become the on state. When the second switching unit 421 becomes the on state, the battery voltage V_BAT may be applied to the gate terminal of the first switching unit 411 through the first resistor 401, as described above. For example, the first switching unit 411 may be implemented by a MOSFET having a characteristic such that the MOSFET becomes an on state when a voltage which is lower than or equal to a preset voltage level is applied to a gate terminal of the MOSFET.

When the battery voltage V_BAT becomes lower than or equal to the preset voltage level and the first switching unit 411 becomes an on state, a current may flow through a battery information output unit (e.g., a red terminal RGB_R of an LED implemented in the form of red, green, and blue (RGB)), and may output (e.g., display) that the voltage of the currently-mounted battery is lower than or equal to the preset level. For example, a source terminal or a drain terminal of the first switching unit 411 is connected to the red terminal RGB_R of the LED and the first switching unit 411 becomes the on state, and accordingly, a current flowing through the red terminal RGB_R of the LED flows through the first switching unit 411 and the second resistor 412. According to various embodiments of the present disclosure, the source terminal or the drain terminal of the first switching unit 411 may be connected to at least one terminal of the LED, and may be connected to battery information output units (e.g., an LCD, a speaker, a vibration motor, a touch screen, etc.) having various forms, according to various embodiments of the present disclosure for outputting battery information.

According to various embodiments of the present disclosure, the battery information output circuit illustrated in FIG. 4 may be connected in parallel to a processor (e.g., an AP) of the electronic apparatus, and accordingly, may output state information of the battery in response to the key input even when the processor (e.g., the AP) of the electronic apparatus does not operate, or even before the electronic apparatus is booted, as described above.

Although the circuit is described as operating when the user presses a preset key in FIG. 4, the battery information output circuit may be implemented to output state information of the battery when a voltage of the battery is lower than or equal to a predetermined level without an input of a separate key by the user (e.g., without controlling the second switching unit 421 to be turned on/off).

Also, the battery information output circuit may be implemented to output state information of the battery in each preset cycle, or to output state information of the battery during a preset time period, in such a manner as to modify the circuit illustrated in FIG. 4 or add at least one circuit element to the circuit illustrated in FIG. 4. Further, when the battery is implemented in such a manner as to be attached/detached to/from the electronic apparatus, the battery information output circuit may be implemented to operate and output state information of the battery only when the battery is mounted on the electronic apparatus.

Figure 5:
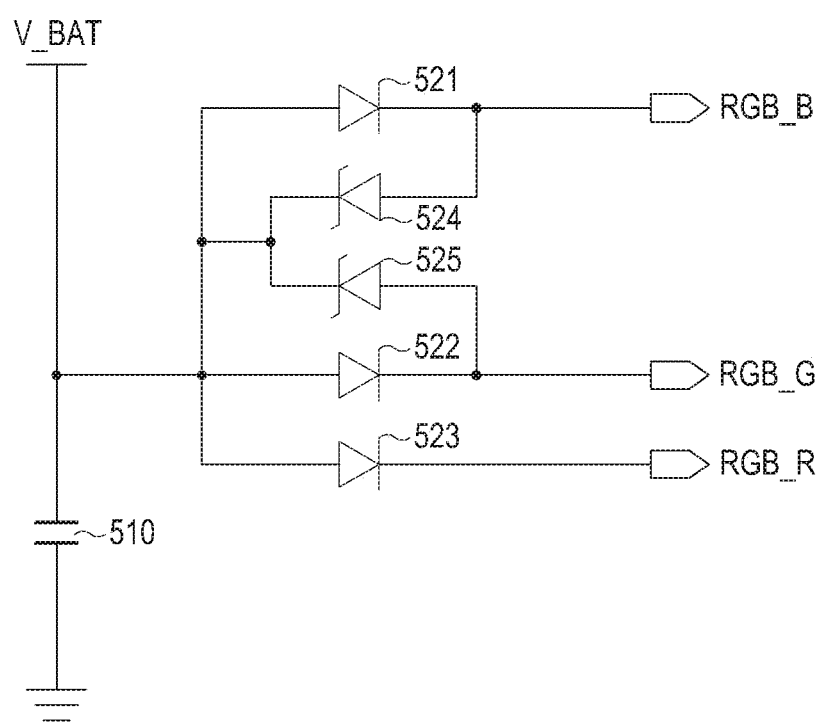
FIG. 5 is a view illustrating a circuit for indicating a battery state according to various embodiments of the present disclosure.

FIG. 5 is a view illustrating a circuit for indicating a battery state according to various embodiments of the present disclosure.

Referring to FIG. 5, according to various embodiments of the present disclosure, the battery information output unit may be implemented by at least one LED.

For example, the circuit for indicating a battery state, according to various embodiments of the present disclosure, may include at least one of a blue emitting diode 521, a green emitting diode 522, a red emitting diode 523, a first Zener diode 524, a second Zener diode 525, and a capacitor 510.

Referring to FIG. 5, when a current flows through a terminal RGB_B, the blue emitting diode 521 connected to the terminal RGB_B may be lit. When a current flows through a terminal RGB_G, the green emitting diode 522 connected to the terminal RGB_G may be lit. When a current flows through a terminal RGB_R, the red emitting diode 523 connected to the terminal RGB_R may be lit. When a reverse voltage is applied to each of the first Zener diode 524 and the second Zener diode 525, a current may flow through each of the first Zener diode 524 and the second Zener diode 525, and thereby, a constant voltage or reference power may be obtained in the circuit illustrated in FIG. 5.

For example, when the terminal RGB_R is connected to one terminal of the first switching unit 411 of the battery voltage determination unit 410 illustrated in FIG. 4, if the first switching unit 411 illustrated in FIG. 4 becomes the on state, the red emitting diode 523 may be lit.

According to various embodiments of the present disclosure, the first switching unit 411 illustrated in FIG. 4 may be connected to not only the terminal RGB_R but also the terminal RGB_G or the terminal RGB_B.

Figure 6:
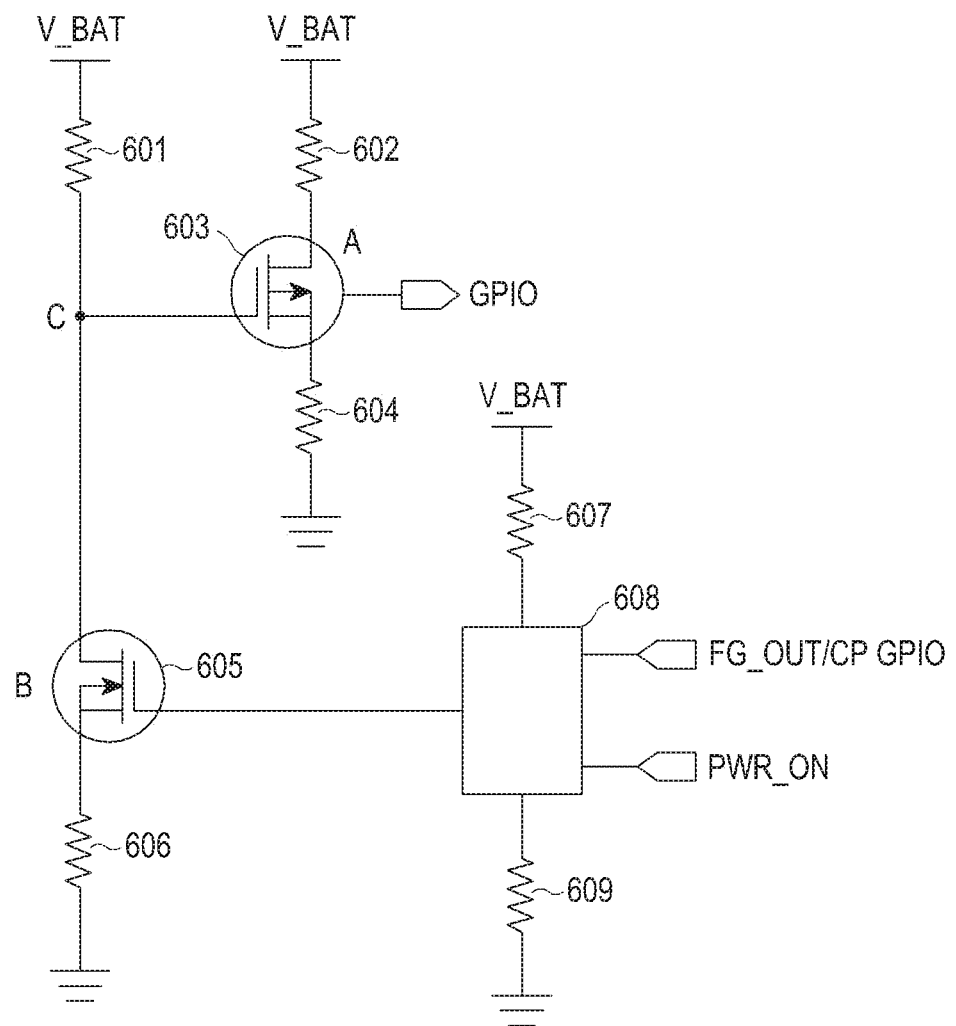
FIG. 6 is a view illustrating a battery information output circuit of an electronic apparatus according to various embodiments of the present disclosure.

FIG. 6 is a view illustrating a battery information output circuit of an electronic apparatus according to various embodiments of the present disclosure. The battery information output circuit illustrated in FIG. 6 may configure at least part of each of the electronic apparatuses described in detail with reference to FIGS. 1 to 3.

Referring to FIG. 6, the battery information output circuit, according to various embodiments of the present disclosure, may include at least one of a first switching unit 603, a second switching unit 605, a first resistor 601, a second resistor 602, a third resistor 604, a fourth resistor 606, a fifth resistor 607, a sixth resistor 609, and a control circuit unit 608. The first switching unit 603, the second resistor 602, and the third resistor 604 form a battery voltage determination unit, and may correspond to each of the battery voltage determination units 130, 230, and 330 illustrated in FIGS. 1 to 3. Also, the second switching unit 605, the control circuit unit 608, the fourth resistor 606, the fifth resistor 607, and the sixth resistor 609 form a battery determination control unit, and may correspond to each of the battery determination control units 120, 220, and 320 illustrated in FIGS. 1 to 3.

The first switching unit 603 and the second switching unit 605 may be implemented by any circuit element capable of being switched by using a voltage level as a control signal. In FIG. 6, a switching unit is implemented by, for example, a MOSFET.

When the second switching unit 605 is in an on state in a state where a battery is mounted on the electronic apparatus, a battery voltage V_BAT may be applied to a gate terminal of the first switching unit 603 through the first resistor 601. A voltage applied to the gate terminal of the first switching unit 603 may be determined by the first resistor 601 and the fourth resistor 606.

According to various embodiments of the present disclosure, although a power-on signal PWR_ON is input to the control circuit unit 608 of the battery determination control unit, the second switching unit 605 may maintain an off state. Also, according to various embodiments of the present disclosure, when a signal is received as input from a CP, a control signal from the control circuit unit 608 may be applied to the second switching unit 605, and thereby, the second switching unit 605 may be switched to the on state.

For example, although the electronic apparatus is booted and becomes a power-on state, the second switching unit 605 may maintain the off state, and thereby may prevent a leakage current from being generated from a battery voltage V_BAT. Also, according to various embodiments of the present disclosure, when power is turned on and then the AP is switched to a sleep mode, the second switching unit 605 may maintain the off state. When the CP periodically wakes up and provides a signal to the control circuit unit 608, the control circuit unit 608 may output a control signal to the second switching unit 605, and thereby may drive the second switching unit 605.

More specifically, when a signal (e.g., CP general purpose input/output (GPIO)) from the CP is applied to the control circuit unit 608 in a state where power of the electronic apparatus is turned on, the control circuit unit 608 may be driven by the battery voltage V_BAT, and may provide a gate terminal of the second switching unit 605 with a current for turning on the second switching unit 605. A signal from the CP may be input at preset time intervals.

When the control circuit unit 608 provides the control signal or the current to the gate terminal of the second switching unit 605 according to the application of the signal from the CP, the second switching unit 605 may become the on state. When the second switching unit 605 becomes the on state, the battery voltage V_BAT may be applied to the gate terminal of the first switching unit 603 through the first resistor 601, as described above. The first switching unit 603 may be implemented by a MOSFET having a characteristic such that the MOSFET becomes an on state when a voltage which is lower than or equal to a preset voltage level is applied to a gate terminal of the MOSFET.

When the battery voltage V_BAT becomes lower than or equal to a preset voltage level and the first switching unit 603 becomes an on state, a current may flow through a battery information output unit (e.g., a red terminal RGB_R of an LED implemented in the form of RGB), and may output or display that the voltage of the currently-mounted battery is lower than or equal to the preset level. For example, a source terminal or a drain terminal of the first switching unit 603 is connected to the red terminal RGB_R of the LED and the first switching unit 603 becomes the on state, and accordingly, a current flowing through the red terminal RGB_R of the LED flows through the second resistor 602, the first switching unit 603, and the third resistor 604. According to various embodiments of the present disclosure, the source terminal or the drain terminal of the first switching unit 603 may be connected to at least one terminal of the LED, and may be connected to battery information output units (e.g., an LCD, a speaker, a vibration motor, a touch screen, etc.) having various forms, according to various embodiments of the present disclosure for outputting battery information.

According to various embodiments of the present disclosure, the battery information output circuit illustrated in FIG. 6 may be connected in parallel to a processor (e.g., an AP) of the electronic apparatus, and accordingly, the CP may control the battery information output circuit illustrated in FIG. 6 to output state information of the battery according to a signal provided by the CP even when the AP of the electronic apparatus is switched to the sleep mode and does not operate, as described above.

Also, according to various embodiments of the present disclosure, the battery information output circuit may be implemented such that the second switching unit 605 becomes the on state when a signal FG_OUT provided by a fuel gauge (FG) is input to the control circuit unit 608.

Also, the battery information output circuit may be implemented to output state information of the battery in each preset cycle, or to output state information of the battery during a preset time period, in such a manner as to modify the circuit illustrated in FIG. 6 or add at least one circuit element to the circuit illustrated in FIG. 6. Further, when the battery is implemented in such a manner as to be attached/detached to/from the electronic apparatus, the battery information output circuit may be implemented to operate and output state information of the battery only when the battery is mounted on the electronic apparatus.

Figure 7:
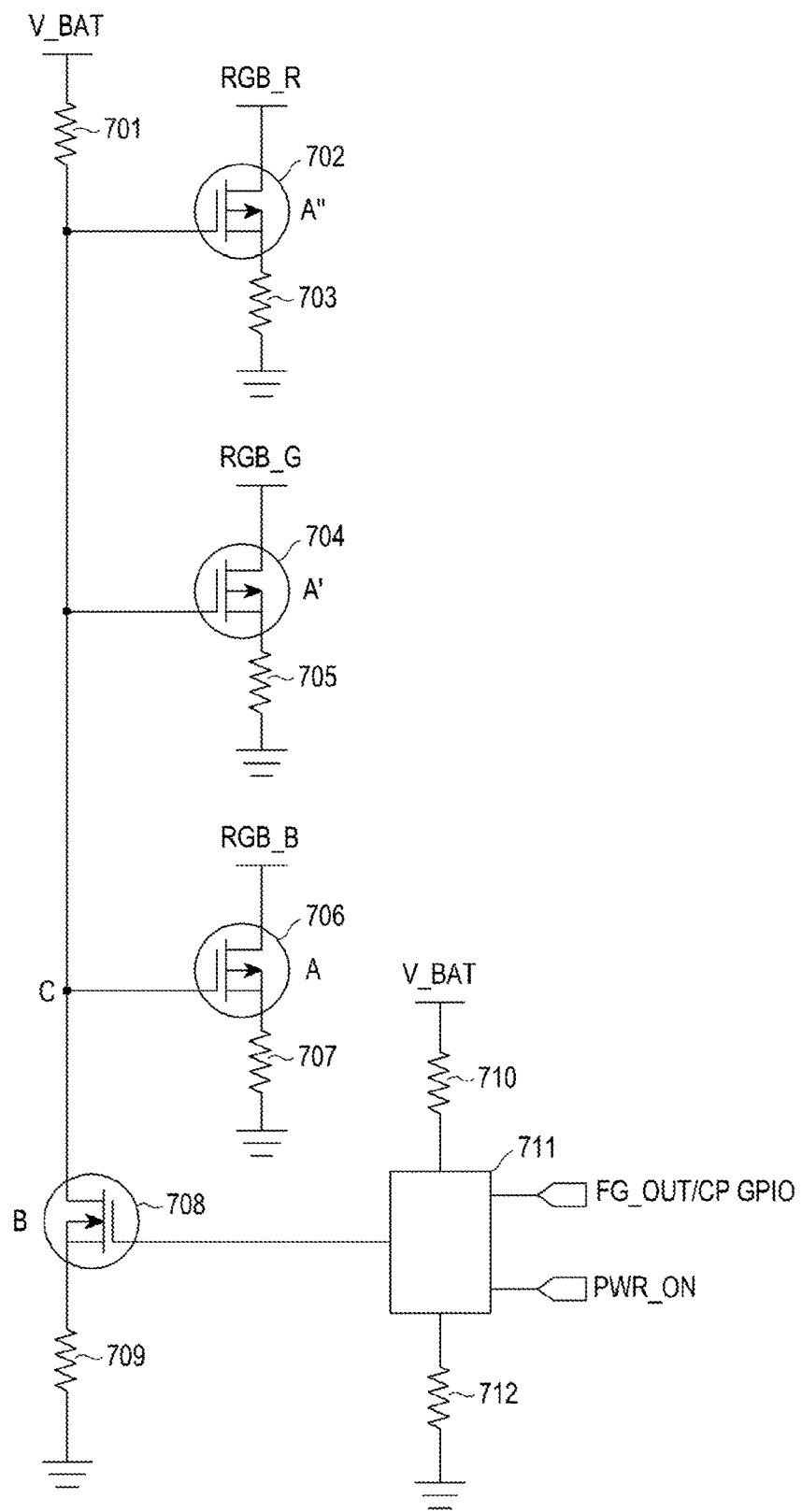
FIG. 7 is a view illustrating a battery information output circuit of an electronic apparatus according to various embodiments of the present disclosure.

FIG. 7 is a view illustrating a battery information output circuit of an electronic apparatus according to various embodiments of the present disclosure.

Referring to FIG. 7, the battery information output circuit, according to various embodiments of the present disclosure, may include at least one of a first switching unit 702, a second switching unit 704, a third switching unit 706, a fourth switching unit 708, a first resistor 701, a second resistor 703, a third resistor 705, a fourth resistor 707, a fifth resistor 709, a sixth resistor 710, a seventh resistor 712, and a control circuit unit 711. The first switching unit 702, the second switching unit 704, the third switching unit 706, the second resistor 703, the third resistor 705, and the fourth resistor 707 form a battery voltage determination unit, and may correspond to each of the battery voltage determination units 130, 230, and 330 illustrated in FIGS. 1 to 3. Also, the fourth switching unit 708, the control circuit unit 711, the fifth resistor 709, the sixth resistor 710, and the seventh resistor 712 form a battery determination control unit, and may correspond to each of the battery determination control units 120, 220, and 320 illustrated in FIGS. 1 to 3.

The first switching unit 702 and the second switching unit 704, the third switching unit 706, or the fourth switching unit 708 may be implemented by any circuit element capable of being switched by using a voltage level as a control signal. In FIG. 7, a switching unit is implemented by, for example, a MOSFET.

When the fourth switching unit 708 is in an on state in a state where a battery is mounted on the electronic apparatus, a battery voltage V_BAT may be applied to a gate terminal of the first switching unit 702, the second switching unit 704, or the third switching unit 706 through the first resistor 701. A voltage applied to the gate terminal of each of the first switching unit 702, the second switching unit 704, and the third switching unit 706 may be determined by at least one of the first resistor 701, the second resistor 703, the third resistor 705, the fourth resistor 707, and the fifth resistor 709.

For example, when the second resistor 703, the third resistor 705, and the fourth resistor 707 are implemented by resistors having different resistances, the first switching unit 702, the second switching unit 704, and the third switching unit 706 may operate in on states if different voltages are applied to the gate terminals of the first switching unit 702, the second switching unit 704, and the third switching unit 706.

For example, according to the adjustment of resistances of the second resistor 703, the third resistor 705, and the fourth resistor 707, the first switching unit 702 may be implemented to be switched to an on state when voltages across the respective switching units are higher than or equal to 4.1 V, the second switching unit 704 may be implemented to be switched to an on state when the voltages across the respective switching units are equal to 3.7 V to 4.1 V, and the third switching unit 706 may be implemented to be switched to an on state when the voltages across the respective switching units are lower than 3.7 V.

According to various embodiments of the present disclosure, diodes of different colors may emit light according to a voltage level of the battery, when one terminal of the first switching unit 702 may be implemented to be connected to a terminal RGB_R, one terminal of the second switching unit 704 may be implemented to be connected to a terminal RGB_G, and one terminal of the third switching unit 706 may be implemented to be connected to a terminal RGB_B.

As described above with reference to FIG. 6, referring to FIG. 7, according to various embodiments of the present disclosure, even when a power-on signal PWR_ON is applied to the control circuit unit 711 of the battery determination control unit, the fourth switching unit 708 may maintain an off state. Also, according to various embodiments of the present disclosure, when a signal (e.g., a CP GPIO signal) is received as input from the CP, a control signal from the control circuit unit 711 may be applied to the fourth switching unit 708, and thereby, the fourth switching unit 708 may be switched to the on state.

For example, although the electronic apparatus is booted and becomes a power-on state, the fourth switching unit 708 may maintain the off state, and thereby may prevent a leakage current from being generated from a battery voltage V_BAT. Also, according to various embodiments of the present disclosure, when power is turned on and then the AP is switched to a sleep mode or a standby state, the fourth switching unit 708 may maintain the off state. When the CP periodically wakes up and provides a signal (e.g., a CP GPIO signal) to the control circuit unit 711, the control circuit unit 711 may output a control signal to the fourth switching unit 708, and thereby may drive the fourth switching unit 708.

More specifically, when a signal from the CP is applied to the control circuit unit 711 in a state where power of the electronic apparatus is turned on, the control circuit unit 711 may be driven by the battery voltage V_BAT, and may provide a gate terminal of the fourth switching unit 708 with a current for turning on the fourth switching unit 708. A signal from the CP may be input at preset time intervals.

When the control circuit unit 711 provides the control signal or the current to the gate terminal of the fourth switching unit 708 according to the application of the signal from the CP, the fourth switching unit 708 may become the on state. When the fourth switching unit 708 becomes the on state, the battery voltage V_BAT may be applied to the gate terminal of the first switching unit 702, the second switching unit 704, or the third switching unit 706 through the first resistor 701, as described above. The first switching unit 702, the second switching unit 704, or the third switching unit 706 may be implemented by a MOSFET having a characteristic such that the MOSFET becomes an on state when a voltage which is lower than or equal to a preset voltage level is applied to a gate terminal of the MOSFET.

When the battery voltage V_BAT becomes lower than or equal to a preset voltage level and at least one of the first switching unit 702, the second switching unit 704, and the third switching unit 706 becomes an on state, a current may flow through a battery information output unit (e.g., a red terminal RGB_R, a green terminal RGB_G, or a blue terminal RGB_B of an LED implemented in the form of RGB), and may output (e.g., display) that the voltage of the currently-mounted battery is in a condition of the preset level.

For example, a source terminal or a drain terminal of the first switching unit 702 is connected to the blue terminal RGB_B of the LED and the first switching unit 702 becomes the on state, and accordingly, a current flowing through the blue terminal RGB_B of the LED flows through the first switching unit 702, and the second resistor 703. Also, for example, a source terminal or a drain terminal of the second switching unit 704 is connected to the green terminal RGB_G of the LED and the second switching unit 704 becomes an on state, and accordingly, a current flowing through the green terminal RGB_G of the LED flows through the second switching unit 704 and the third resistor 705. Further, for example, a source terminal or a drain terminal of the third switching unit 706 is connected to the red terminal RGB_R of the LED and the third switching unit 706 becomes an on state, and accordingly, a current flowing through the red terminal RGB_R of the LED flows through the third switching unit 706 and the fourth resistor 707.

According to various embodiments of the present disclosure, the source terminal or the drain terminal of the first switching unit 702, the second switching unit 704, or the third switching unit 706 may be connected to at least one terminal of the LED, and may be connected to battery information output units (e.g., an LCD, a speaker, a vibration motor, a touch screen, etc.) having various forms, according to various embodiments of the present disclosure for outputting battery information.

According to various embodiments of the present disclosure, the battery information output circuit illustrated in FIG. 7 may be connected in parallel to a processor (e.g., an AP) of the electronic apparatus, and accordingly, the CP may control the battery information output circuit illustrated in FIG. 6 to output state information of the battery according to a signal provided by the CP even when the AP of the electronic apparatus is switched to the sleep mode or the standby mode and does not operate, as described above.

Also, according to various embodiments of the present disclosure, the battery information output circuit may be implemented such that the fourth switching unit 708 becomes the on state when a signal FG_OUT provided by a fuel gauge is input to the control circuit unit 711.

Also, the battery information output circuit may be implemented to output state information of the battery in each preset cycle, or to output state information of the battery during a preset time period, in such a manner as to modify the circuit illustrated in FIG. 7 or add at least one circuit element to the circuit illustrated in FIG. 7. Further, when the battery is implemented in such a manner as to be attached/detached to/from the electronic apparatus, the battery information output circuit may be implemented to operate and output state information of the battery only when the battery is mounted on the electronic apparatus.

Hereinafter, an operating method of the electronic apparatus, according to various embodiments of the present disclosure, will be described with reference to FIGS. 8 to 10.

Figure 8:
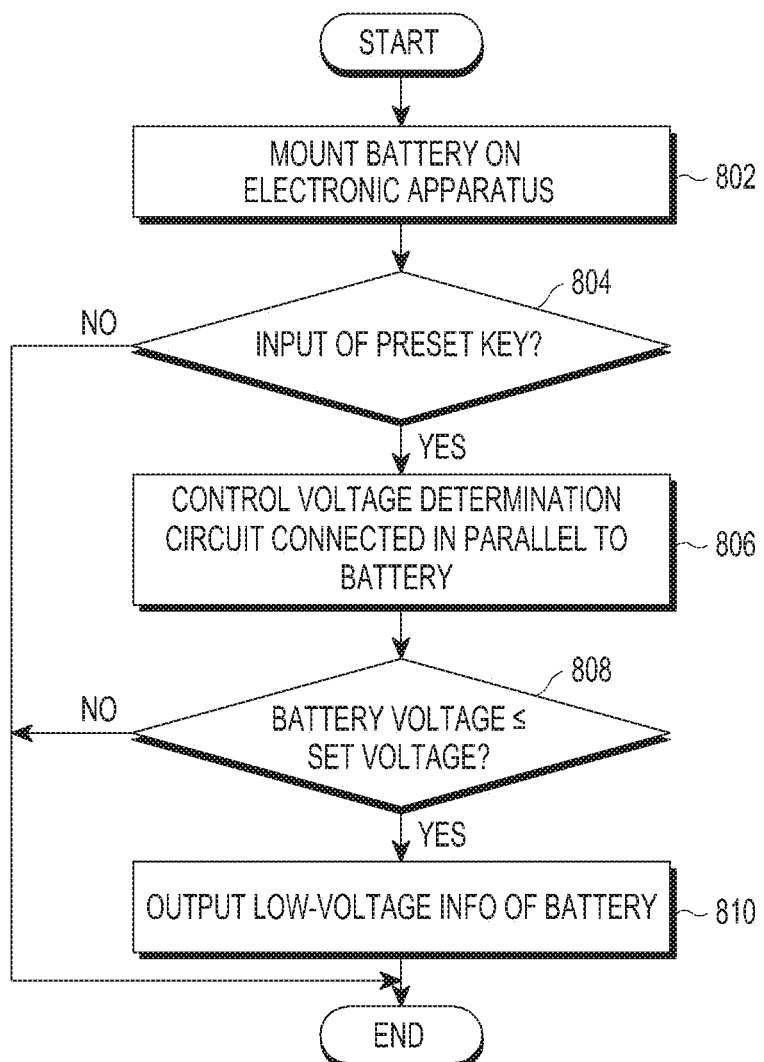
FIG. 8 is a flowchart illustrating a process for providing battery information in an electronic apparatus according to various embodiments of the present disclosure.

FIG. 8 is a flowchart illustrating a process for providing battery information in an electronic apparatus according to various embodiments of the present disclosure.

Referring to FIG. 8, in operation 802, a battery may be mounted on the electronic apparatus, and an input of a preset key (e.g., a power key) may be performed in operation 804.

When the input of the preset key is performed, in operation 806, a voltage determination circuit connected to the battery, which is mounted on the electronic apparatus, in parallel with a processor may be controlled. In operation 808, according to the control of the voltage determination circuit, a determination may be made as to whether a voltage of the battery mounted on the electronic apparatus is lower than or equal to a set voltage.

When it is determined that the voltage of the battery is lower than or equal to the set voltage, in operation 810, low-voltage information of the battery may be output.

Figure 9:
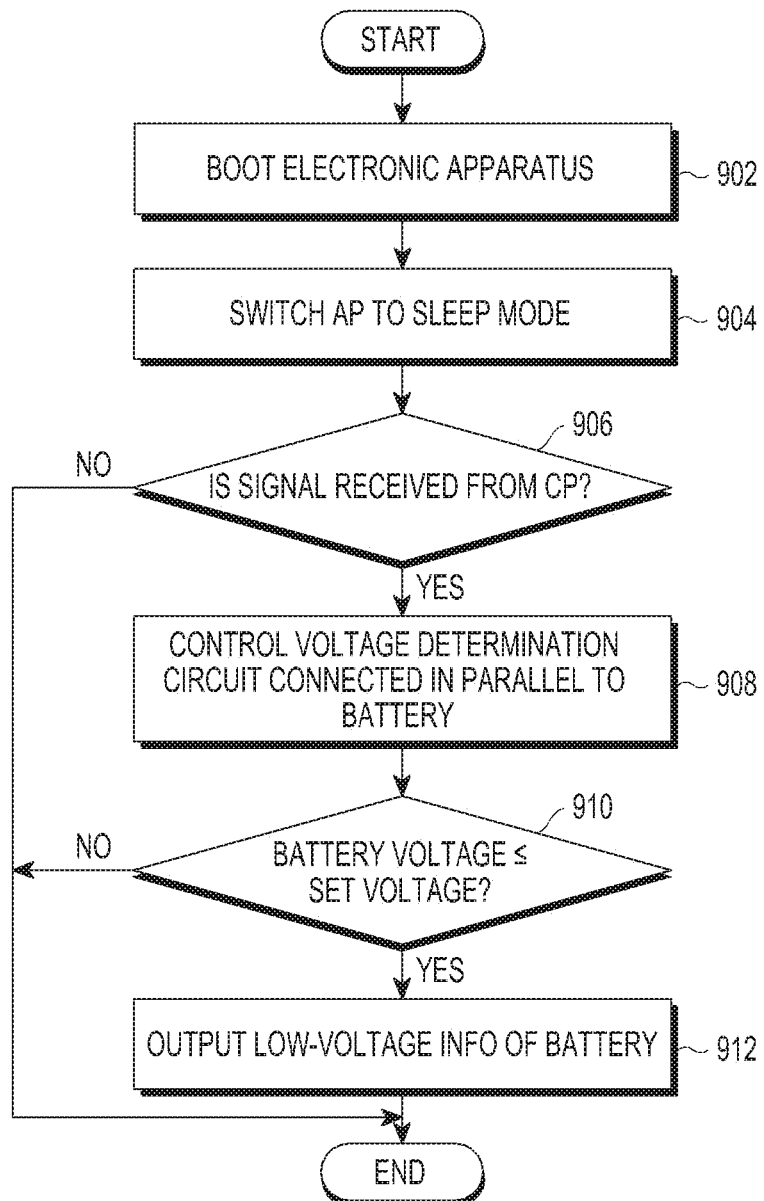
FIG. 9 is a flowchart illustrating a process for providing battery information in an electronic apparatus according to various embodiments of the present disclosure.

FIG. 9 is a flowchart illustrating a process for providing battery information in an electronic apparatus according to various embodiments of the present disclosure.

Referring to FIG. 9, in operation 902, the electronic apparatus may be booted, and accordingly, a processor (e.g., an AP) may operate.

When the electronic apparatus satisfies a preset sleep mode switching condition (e.g., a case in which an input is not received from a user during a preset time period or longer), in operation 904, the AP may be switched to the sleep mode. In the sleep mode state, in order to save power, the AP may not operate, or may perform only a minimum operation.

In the state where the AP is switched to the sleep mode, a CP periodically wakes up and may operate.

When the CP wakes up and transmits a signal in operation 906, in operation 908, a voltage determination circuit connected to a battery, which is mounted on the electronic apparatus, in parallel with the processor may be controlled. In operation 910, according to the control of the voltage determination circuit, a determination may be made as to whether a voltage of the battery mounted on the electronic apparatus is lower than or equal to a set voltage.

When it is determined that the voltage of the battery is lower than or equal to the set voltage, in operation 912, low-voltage information of the battery may be output.

Figure 10:
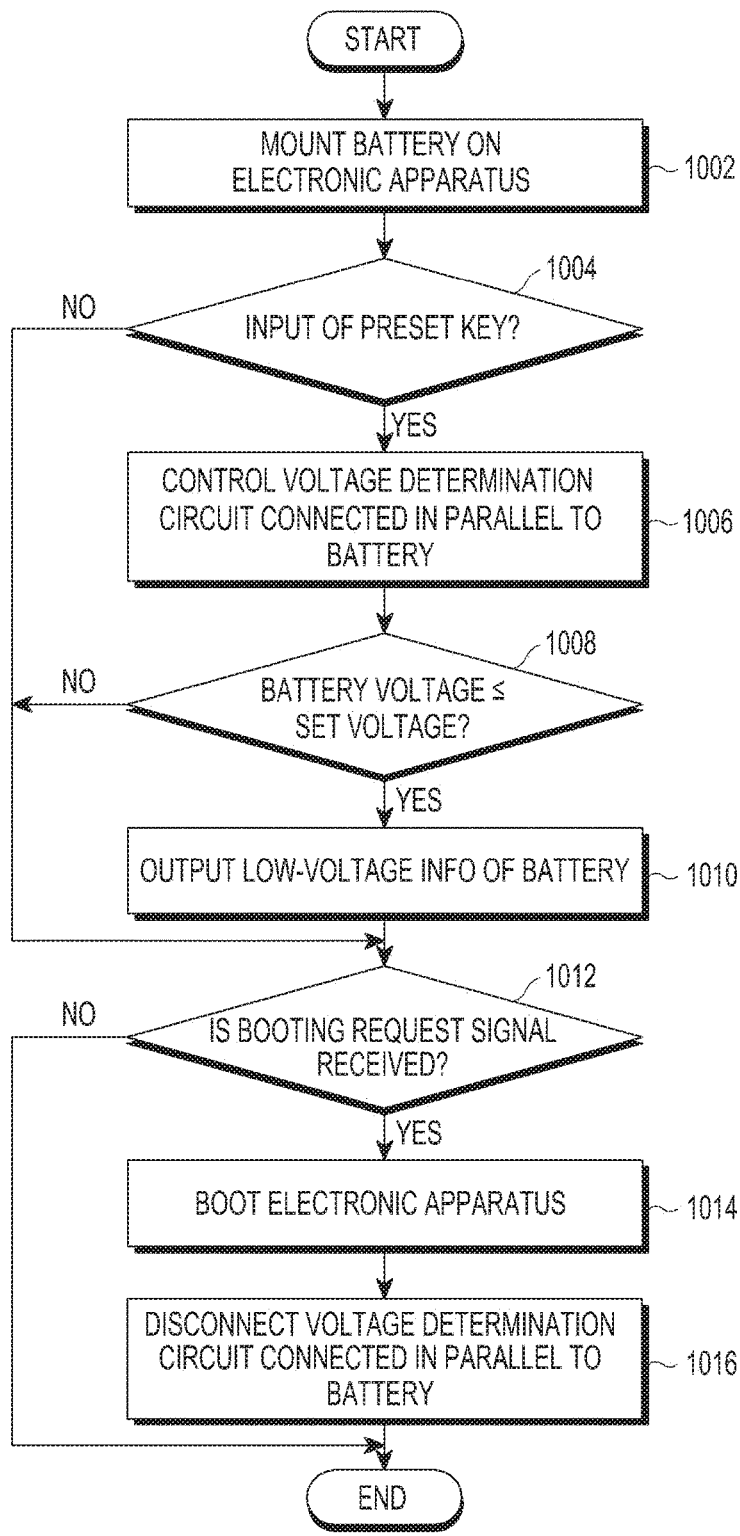
FIG. 10 is a flowchart illustrating a process for providing battery information in an electronic apparatus according to various embodiments of the present disclosure.

FIG. 10 is a flowchart illustrating a process for providing battery information in an electronic apparatus according to various embodiments of the present disclosure.

Referring to FIG. 10, in operation 1002, a battery may be mounted on the electronic apparatus, and an input of a preset key (e.g., a power key) may be performed in operation 1004.

When the input of the preset key is performed, in operation 1006, a voltage determination circuit connected to the battery, which is mounted on the electronic apparatus, in parallel with a processor may be controlled. In operation 1008, according to the control of the voltage determination circuit, a determination may be made as to whether a voltage of the battery mounted on the electronic apparatus is lower than or equal to a set voltage.

When it is determined that the voltage of the battery is lower than or equal to the set voltage, in operation 1010, low-voltage information of the battery may be output.

When a user turns on power of the electronic apparatus, in operation 1012, a processor of the electronic apparatus may receive a booting request signal, and may perform a process for booting the electronic apparatus, in operation 1014.

When the electronic apparatus is booted and the process operates, in operation 1016, the processor may perform a control operation for disconnecting a voltage determination circuit connected to the battery, which is mounted on the electronic apparatus, in parallel with the processor. The voltage determination circuit is disconnected, so that a determination of the voltage of the battery can prevent an unnecessary current from flowing through a circuit that outputs low-voltage information of the battery.

The processes may be performed in a state of omitting at least one of the operations illustrated in FIGS. 8 to 10, or at least one operation may be added between the operations. Alternatively, the operations illustrated in FIGS. 8 to 10 may be performed in sequential order illustrated in FIGS. 8 to 10, or may be performed in such a manner that a sequential order in which at least one operation is performed is changed in association with a sequential order in which another operation is performed.

In a method for providing battery information in an electronic apparatus, an operating method of the electronic apparatus, according to one of various embodiments of the present disclosure, may include determining whether an input of a preset key is performed, in a state where at least one battery is mounted on the electronic apparatus; determining whether a voltage of the at least one battery satisfies a designated condition, by a battery voltage determination unit connected to the at least one battery in parallel with a processor, supplied with power directly from the at least one battery, and operates using the power, when the input of the preset key is performed; and outputting state information of the at least one battery when the voltage of the at least one battery satisfies the designated condition.

According to various embodiments of the present disclosure, the preset key may be a power key that turns on power of the electronic apparatus.

According to various embodiments of the present disclosure, the determining whether the input of the preset key is performed may be performed in a power-off state of the electronic apparatus.

According to various embodiments of the present disclosure, the determining whether the input of the preset key is performed may be performed in a state where an AP of the electronic apparatus is in a sleep mode.

According to various embodiments of the present disclosure, the operating method may include receiving a booting request signal and booting the electronic apparatus, by the processor of the electronic apparatus; and performing a control operation for disconnecting a voltage determination circuit connected to the at least one battery, which is mounted on the electronic apparatus, in parallel with the processor when the booting of the electronic apparatus is completed.

According to various embodiments of the present disclosure, the outputting of the state information of the at least one battery may be performed in a warm booting state of the electronic apparatus.

According to various embodiments of the present disclosure, the outputting of the state information of the at least one battery may include outputting the state information of the at least one battery by at least one of an LCD, an LED, a touch screen, a speaker, and a vibration element.

In a method for providing battery information in an electronic apparatus, an operating method of the electronic apparatus, according to one of various embodiments of the present disclosure, may include receiving a booting request signal and booting the electronic apparatus, by an AP of the electronic apparatus; switching the AP to a sleep mode when the electronic apparatus satisfies a preset sleep mode switching condition; determining whether a signal is received from a CP, in a state of the sleep mode; determining whether a voltage of at least one battery satisfies a designated condition, by a battery voltage determination unit connected to the at least one battery in parallel with the processor, supplied with power directly from the at least one battery, and operates with the power, when the signal is received from the communication processor; and outputting state information of the at least one battery when the voltage of the at least one battery satisfies the designated condition.

According to various embodiments of the present disclosure, the outputting of the state information of the at least one battery may be performed in a warm booting state of the electronic apparatus.

According to various embodiments of the present disclosure, the outputting of the state information of the at least one battery may include outputting the state information of the battery by at least one of an LCD, an LED, a touch screen, a speaker, and a vibration element.

Figure 11:
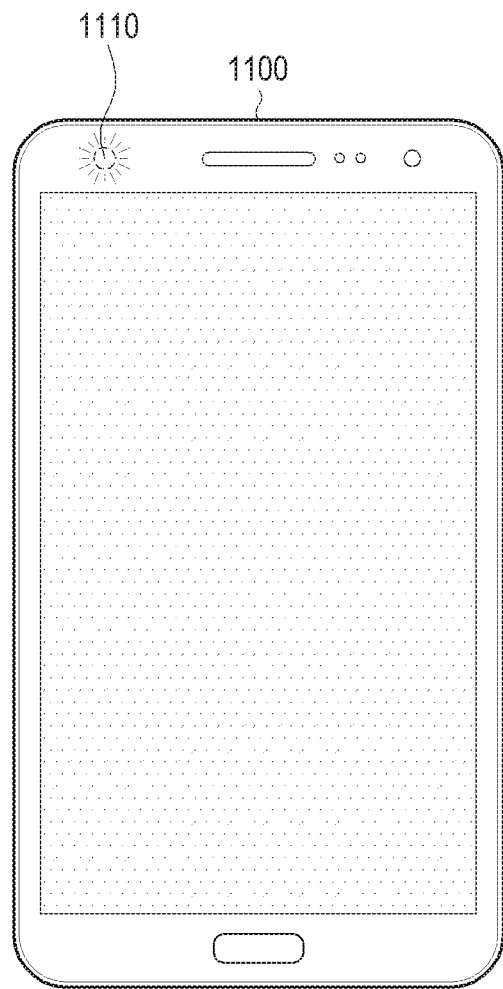
FIG. 11 is a view illustrating an example of the output of battery information from an electronic apparatus according to various embodiments of the present disclosure.

FIG. 11 is a view illustrating an example of the output of battery information from an electronic apparatus according to various embodiments of the present disclosure.

Referring to FIG. 11, when a voltage of a battery mounted on the electronic apparatus 1100 satisfies a preset condition even in a power-off state of the electronic apparatus 1100, an LED 1110 included in the electronic apparatus 1100 may be lit.

According to various embodiments of the present disclosure, a user may confirm the voltage of the battery mounted on the electronic apparatus 1100 even in the power-off state of the electronic apparatus 1100. For example, in order to confirm the voltage of the battery, the user does not need to turn on the electronic apparatus 1100 and wait for a time period for booting the electronic apparatus 1100. Also, it is possible to reduce the unnecessary power consumption of the battery which occurs when the user turns on the screen and boots the electronic apparatus in order to confirm the voltage of the battery.

Further, according to various embodiments of the present disclosure, even after power of the electronic apparatus 1100 is turned on, when the electronic apparatus 1100 becomes a sleep mode or a standby state, the voltage of the battery may be confirmed even without driving a processor of the electronic apparatus 1100.

Figure 12:
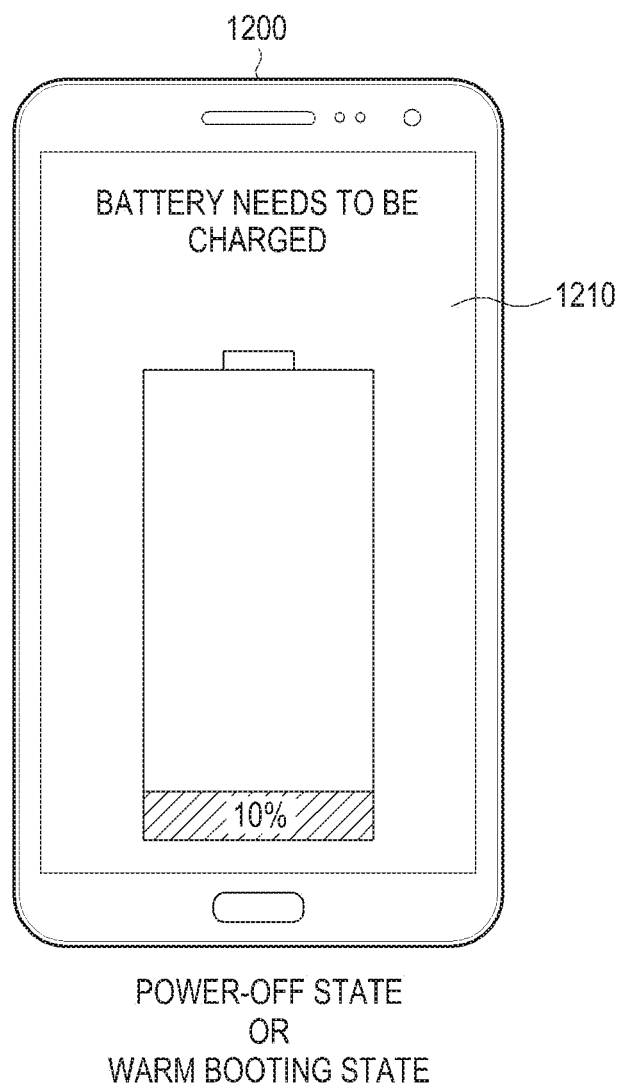
FIG. 12 is a view illustrating an example of the output of battery information from an electronic apparatus according to various embodiments of the present disclosure.

FIG. 12 is a view illustrating an example of the output of battery information from an electronic apparatus according to various embodiments of the present disclosure.

Referring to FIG. 12, when a voltage of a battery mounted on the electronic apparatus 1200 satisfies a preset condition even in a power-off state of the electronic apparatus 1200, a state of the battery may be displayed on a display unit (e.g., a touch screen) 1210 of the electronic apparatus 1200. For example, when, in the power-off state of the electronic apparatus 1200, the voltage of the battery satisfies the preset condition or a user presses a preset key, the electronic apparatus 1200 may not be booted but only the display unit 1210 may be driven in a warn booting state of the electronic apparatus 1200, and thereby, a battery state of the electronic apparatus 1200 may be displayed on the display unit 1210.

Hereinafter, an example of the implementation of an electronic apparatus will be described with reference to FIGS. 13 and 14.

Figure 13:
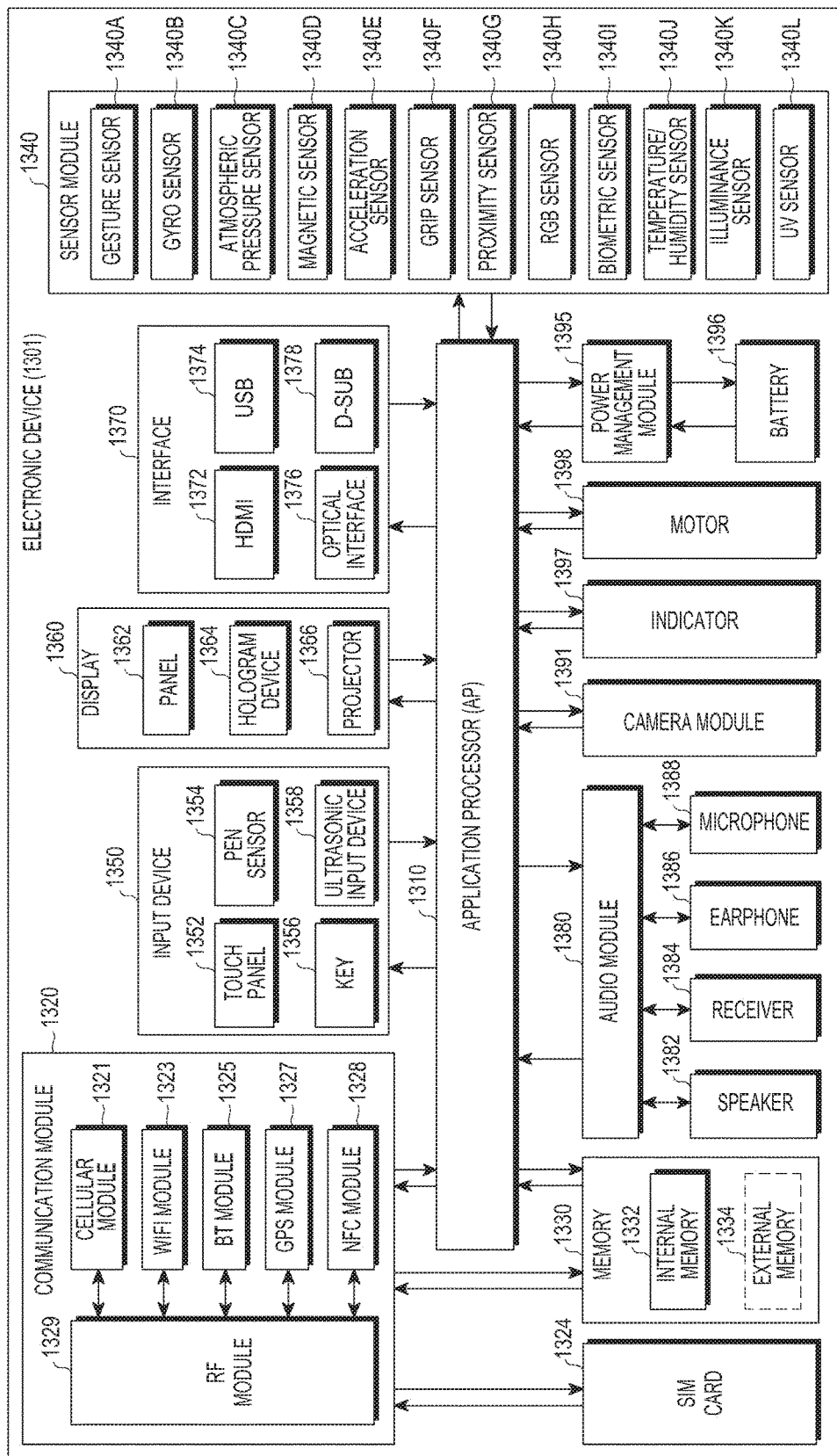
FIG. 13 is a block diagram illustrating a detailed configuration of an electronic apparatus according to various embodiments of the present disclosure.

FIG. 13 is a block diagram illustrating a detailed configuration of an electronic apparatus 1301 according to various embodiments of the present disclosure. For example, the electronic apparatus 1301 may include the whole or part of the electronic apparatus illustrated in FIG. 3. The electronic apparatus 1301 may include at least one AP (e.g., the processor 120 or an AP 1310), a communication module 1320, a SIM card 1324, a memory 1330, a sensor module 1340, an input device 1350, a display 1360, an interface 1370, an audio module 1380, a camera module 1391, a power management module 1395, a battery 1396, an indicator 1397, and a motor 1398.

Referring to FIG. 13, the AP 1310 may control multiple hardware or software elements connected to the AP 1310 by running, for example, an OS or an application program, and may perform the processing of and arithmetic operations on various data. The AP 1310 may be implemented by, for example, a SoC. According to an embodiment of the present disclosure, the AP 1310 may further include a GPU and/or an image signal processor. The AP 1310 may include at least some (e.g., a cellular module 1321) of the elements illustrated in FIG. 13. The AP 1310 may load, into a volatile memory, instructions or data received from at least one (e.g., a non-volatile memory) of the other elements and may process the loaded instructions or data, and may store various data in a non-volatile memory.

The communication module 1320 may include, for example, the cellular module 1321, a Wi-Fi module 1323, a BT module 1325, a GPS module 1327, an NFC module 1328, and a radio frequency (RF) module 1329.

For example, the cellular module 1321 may provide a voice call, an image call, a text message service, an Internet service, and the like through a communication network. According to an embodiment of the present disclosure, the cellular module 1321 may identify and authenticate an electronic apparatus 1301 in the communication network by using the subscriber identification module (e.g., a SIM card) 1324. According to an embodiment of the present disclosure, the cellular module 1321 may perform at least some of the functions that the AP 1310 may provide. According to an embodiment of the present disclosure, the cellular module 1321 may include a CP.

Each of the Wi-Fi module 1323, the BT module 1325, the GPS module 1327, and the NFC module 1328 may include, for example, a processor for processing data transmitted and received through the relevant module. According to some embodiments of the present disclosure, at least some (e.g., two or more) of the cellular module 1321, the Wi-Fi module 1323, the BT module 1325, the GPS module 1327, and the NFC module 1328 may be included in one integrated chip (IC) or IC package.

The RF module 1329 may transmit and receive, for example, communication signals (e.g., RF signals). The RF module 1329 may include, for example, a transceiver, a PAM, a frequency filter, a LNA, and an antenna. According to another embodiment of the present disclosure, at least one of the cellular module 1321, the Wi-Fi module 1323, the BT module 1325, the GPS module 1327, and the NFC module 1328 may transmit and receive RF signals through a separate RF module.

The SIM card 1324 may include, for example, a card including a subscriber identity module and/or an embedded SIM, and may contain unique identification information (e.g., an integrated circuit card identifier (ICCID)) or subscriber information (e.g., an international mobile subscriber identity (IMSI)).

The memory 1330 may include, for example, an internal memory 1332 or an external memory 1334. The internal memory 1332 may include at least one of, for example, a volatile memory (e.g., a dynamic random access memory (DRAM), a static RAM (SRAM), a synchronous DRAM (SDRAM), etc.); a non-volatile memory (e.g., a one time programmable read-only memory (OTPROM), a PROM, an erasable and programmable ROM (EPROM), an electrically EPROM (EEPROM), a mask ROM, a flash ROM, a flash memory (e.g., a not AND (NAND) flash memory, a not OR (NOR) flash memory, etc.); a hard drive; and a solid state drive (SSD).

The external memory 1334 may further include a flash drive, for example, a compact flash (CF), a secure digital (SD), a micro-SD (Micro-SD), a mini-SD (Mini-SD), an extreme digital (xD), a memory stick, or the like. The external memory 1334 may be functionally and/or physically connected to the electronic apparatus 1301 through various interfaces.

For example, the sensor module 1340 may measure a physical quantity or may detect an operation state of the electronic apparatus 1301, and may convert the measured physical quantity or the detected operation state into an electrical signal. The sensor module 1340 may include at least one of, for example, a gesture sensor 1340A, a gyro sensor 1340B, an atmospheric pressure sensor 1340C, a magnetic sensor 1340D, an acceleration sensor 1340E, a grip sensor 1340F, a proximity sensor 1340G, a color sensor (e.g., a RGB sensor 1340H), a biometric sensor 1340I, a temperature/humidity sensor 1340J, an illuminance sensor 1340K, and an ultraviolet (UV) sensor 1340L. Additionally or alternatively, the sensor module 1340 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1340 may further include a control circuit for controlling one or more sensors included therein. In some embodiments of the present disclosure, the electronic apparatus 1301 may further include a processor configured to control the sensor module 1340 as a part of or separately from the AP 1310, and may control the sensor module 1340 while the AP 1310 is in a sleep state.

The input device 1350 may include, for example, a touch panel 1352, a (digital) pen sensor 1354, a key 1356, and an ultrasonic input unit 1358. The touch panel 1352 may use at least one of, for example, a capacitive scheme, a resistive scheme, an infrared scheme, and a surface acoustic wave scheme. Also, the touch panel 1352 may further include a control circuit. The touch panel 1352 may further include a tactile layer and may provide a tactile response to the user.

The (digital) pen sensor 1354 may include, for example, a recognition sheet which is a part of the touch panel or is separated from the touch panel. Examples of the key 1356 may include a physical button, an optical key, and a keypad. The ultrasonic input unit 1358 may sense an ultrasonic wave by using a microphone (e.g., the microphone 1388) in the electronic apparatus 1301, from an input means that generates an ultrasonic signal, and may confirm data corresponding to the sensed ultrasonic wave.

The display 1360 may include a panel 1362, a hologram unit 1364, and a projector 1366. The panel 1362 may correspond to each of the battery information output units 140, 240, and 340 illustrated in FIGS. 1 to 3. The panel 1362 may be implemented to be, for example, flexible, transparent, or wearable. The panel 1362 and the touch panel 1352 may be implemented as one module. The hologram unit 1364 may display a three-dimensional image in the air by using the interference of light. The projector 1366 may display an image by projecting light onto a screen. The screen may be located, for example, inside or outside the electronic apparatus 1301. According to an embodiment of the present disclosure, the display 1360 may further include a control circuit for controlling the panel 1362, the hologram unit 1364, or the projector 1366.

The interface 1370 may include, for example, a high-definition multimedia interface (HDMI) 1372, a universal serial bus (USB) 1374, an optical interface 1376, and a D-subminiature (D-sub) 1378. Additionally or alternatively, the interface 1370 may include, for example, a mobile high-definition link (MHL) interface, a SD card/Multi-Media Card (MMC) interface, or an IR data association (IrDA) standard interface.

For example, the audio module 1380 may bidirectionally convert between a sound and an electrical signal. The audio module 1380 may process sound information which is input or output through, for example, a speaker 1382, a receiver 1384, an earphone 1386, the microphone 1388, or the like.

The camera module 1391 is, for example, a device capable of capturing a still image and a moving image. According to an embodiment of the present disclosure, the camera module 1391 may include one or more image sensors (e.g., a front sensor or a back sensor), a lens, an image signal processor (ISP), and a flash (e.g., an LED, a xenon lamp, or the like).

The power management module 1395 may manage, for example, power of the electronic apparatus 1301. According to an embodiment of the present disclosure, the power management module 1395 may include a power management integrated circuit (PMIC), a charger IC, or a battery fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery fuel gauge may measure, for example, a residual quantity of the battery 1396, and a voltage, a current, or a temperature during the charging. Examples of the battery 1396 may include a rechargeable battery and a solar battery.

The indicator 1397 may display a particular state (e.g., a booting state, a message state, a charging state, or the like) of the electronic apparatus 1301 or a part (e.g., the AP 1310) of the electronic apparatus 1301. The motor 1398 may convert an electrical signal into mechanical vibration, and may generate vibration, a haptic effect, or the like. Although not illustrated, the electronic apparatus 1301 may include a processing unit (e.g., a GPU) for supporting a mobile TV. The processing unit for supporting a mobile TV may process media data according to a standard, such as, for example, digital multimedia broadcasting (DMB), digital video broadcasting (DVB), or media flow.

Each of the components of the electronic device according to the present disclosure may be implemented by one or more components and the name of the corresponding component may vary depending on a type of the electronic device. In various embodiments of the present disclosure, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

Figure 14:
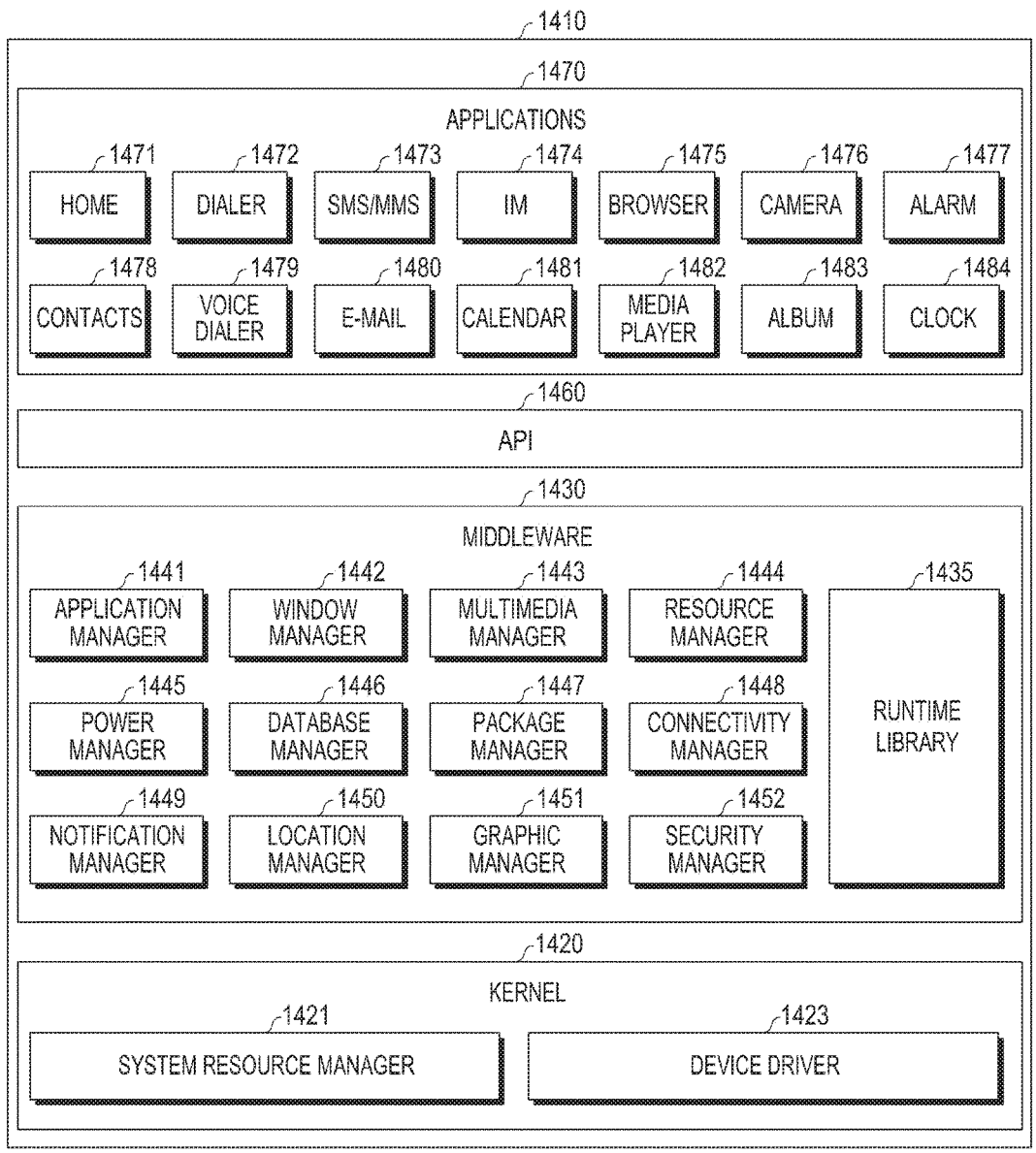
FIG. 14 is a block diagram illustrating a configuration of a program module according to various embodiments of the present disclosure.

FIG. 14 is a block diagram illustrating a configuration of a program module 1410 according to various embodiments of the present disclosure. According to an embodiment of the present disclosure, the program module 1410 may include an OS for controlling resources related to the electronic apparatus and/or various applications (e.g., application programs) executed in the OS. The OS may be, for example, Android, iOS, Windows, Symbian, Tizen, Bada, and the like.

Referring to FIG. 14, the program module 1410 may include a kernel 1420, middleware 1430, an API 1460, and/or an application 1470. At least some of the program module 1410 may be preloaded on the electronic apparatus, or may be downloaded from a server.

The kernel 1420 may include, for example, a system resource manager 1421 and/or a device driver 1423. The system resource manager 1421 may perform the control, allocation, retrieval, or the like of system resources. According to an embodiment of the present disclosure, the system resource manager 1421 may include a process manager, a memory manager, a file system manager, or the like. The device driver 1423 may include, for example, a display driver, a camera driver, a BT driver, a shared memory driver, a USB driver, a keypad driver, a Wi-Fi driver, an audio driver, or an inter-process communication (IPC) driver.

For example, the middleware 1430 may provide a function required in common by the applications 1470, or may provide various functions to the applications 1470 through the API 1460 so as to enable the applications 1470 to efficiently use the limited system resources within the electronic apparatus. According to an embodiment of the present disclosure, the middleware 1430 may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, and a security manager 1452.

The application manager 1441 may manage, for example, the life cycle of at least one of the applications 1470. The window manager 1442 may manage graphical user interface (GUI) resources used for the screen. The multimedia manager 1443 may determine a format required to reproduce various media files, and may encode or decode a media file by using a coder/decoder (codec) appropriate for the relevant format. The resource manager 1444 may manage resources, such as a source code, a memory, a storage space, and the like of at least one of the applications 1470.

For example, the power manager 1445 may operate together with a basic input/output system (BIOS), etc. and may manage a battery or power, and may provide power information and the like required for an operation of the electronic apparatus. The database manager 1446 may generate, search for, and/or change a database to be used by at least one of the applications 1470. The package manager 1447 may manage the installation or update of an application distributed in the form of a package file.

The connectivity manager 1448 may manage a wireless connection such as, for example, Wi-Fi or BT. The notification manager 1449 may display or notify of an event, such as an arrival message, an appointment, a proximity notification, and the like, in such a manner as not to disturb the user. The location manager 1450 may manage location information of the electronic apparatus. The graphic manager 1451 may manage a graphic effect, which is to be provided to the user, or a user interface related to the graphic effect. The security manager 1452 may provide various security functions required for system security, user authentication, and the like. According to an embodiment of the present disclosure, when the electronic apparatus (e.g., the electronic apparatuses illustrated in FIGS. 1 to 3) has a telephone call function, the middleware 1430 may further include a telephony manager for managing a voice call function or a video call function of the electronic apparatus.

The middleware 1430 may include a middleware module that forms a combination of various functions of the above-described elements. The middleware 1430 may provide a module specialized for each type of OS in order to provide a differentiated function. Also, the middleware 1430 may dynamically delete some of the existing elements, or may add new elements.

The API 1460 is, for example, a set of API programming functions, and may be provided with a different configuration according to an OS. For example, in the case of Android or iOS, one API set may be provided for each platform. In the case of Tizen, two or more API sets may be provided for each platform.

The applications 1470 may include one or more applications capable of performing functions, such as, for example, a home 1471, a dialer 1472, an short message service (SMS)/multimedia messaging service (MMS) 1473, an instant message (IM) 1474, a browser 1475, a camera 1476, an alarm 1477, a contacts 1478, a voice dialer 1479, an email 1480, a calendar 1481, a media player 1482, an album 1483, a clock 1484, health care (e.g., which measures an exercise quantity, a blood sugar level, or the like), and providing of environmental information (e.g., information on atmospheric pressure, humidity, temperature, or the like).

According to an embodiment of the present disclosure, the applications 1470 may include an application (hereinafter, referred to as an "information exchange application" for convenience of description) supporting information exchange between the electronic apparatus (e.g., the electronic apparatuses illustrated in FIGS. 1 to 3) and an external electronic apparatus. Examples of the information exchange application may include a notification relay application for delivering particular information to an external electronic apparatus and a device management application for managing an external electronic apparatus.

For example, the notification relay application may include a function of delivering, to the external electronic apparatus, notification information generated by other applications (e.g., an SMS/MMS application, an email application, a health care application, an environmental information application, etc.) of the electronic apparatus 101. Also, for example, the notification relay application may receive notification information from the external electronic apparatus and may provide the received notification information to the user. The device management application may manage (e.g., install, delete, or update), for example, at least one function (e.g., turning on/off the external electronic apparatus itself (or some component parts thereof) or adjusting the brightness (or resolution) of the display) of the external electronic apparatus communicating with the electronic apparatus, an application executed in the external electronic apparatus, or a service (e.g., a telephone call service, a message service, or the like) provided by the electronic apparatus.

According to an embodiment of the present disclosure, the application 1470 may include an application (e.g., a health care application) designated according to an attribute (e.g., which is an attribute of an electronic apparatus, and the type of electronic apparatus is a mobile medical device) of the external electronic apparatus. According to an embodiment of the present disclosure, the application 1470 may include an application received from the external electronic apparatus. According to an embodiment of the present disclosure, the application 1470 may include a preloaded application or a third party application which can be downloaded from the server. The names of the elements of the program module 1410, according to the embodiment illustrated in the drawing, may vary according to the type of operating system.

According to various embodiments of the present disclosure, at least a part of the program module 1410 may be implemented in software, firmware, hardware, or a combination of two or more thereof. At least some of the program module 1410 may be implemented (for example, executed) by, for example, the processor (for example, the AP 1310). At least a part of the program module 1410 may include, for example, a module, a program, a routine, sets of instructions, or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" or "function unit" may be a minimum unit of an integrated component element or a part thereof. The "module" may be a minimum unit for performing one or more functions or a part thereof. The "module" or "function unit" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. The instruction, when executed by a processor (e.g., the processor 150), may cause the one or more processors to execute the function corresponding to the instruction. The computer-readable storage medium may be, for example, the memory.

The computer readable recoding medium may include a hard disk, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, in a storage medium that stores instructions, the instructions may be configured to cause at least one processor to perform at least one operation when executed by the at least one processor, and the at least one operation may include: determining whether an input of a preset key is performed, in a state where at least one battery is mounted on the electronic apparatus; determining whether a voltage of the at least one battery satisfies a designated condition, by a battery voltage determination unit connected to the at least one battery in parallel with a processor, supplied with power directly from the at least one battery, and operates using the power, when the input of the preset key is performed; and outputting state information of the at least one battery when the voltage of the at least one battery satisfies the designated condition.

Also, according to various embodiments of the present disclosure, in a storage medium that stores instructions, the instructions may be configured to cause at least one processor to perform at least one operation when executed by the at least one processor, and the at least one operation may include: receiving a booting request signal and booting the electronic apparatus, by an AP of the electronic apparatus; switching the AP to a sleep mode when the electronic apparatus satisfies a preset sleep mode switching condition; determining whether a signal is received from a CP, in a state of the sleep mode; determining whether a voltage of at least one battery satisfies a designated condition, by a battery voltage determination unit connected to the at least one battery in parallel with the processor, supplied with power directly from the at least one battery, and operates with the power, when the signal is received from the communication processor; and outputting state information of the at least one battery when the voltage of the at least one battery satisfies the designated condition.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
a battery;
a plurality of processors coupled to the battery, wherein the plurality of processors include an application processor and a wireless communication processor;
a voltage determination circuit connected to the battery in parallel with the application processor, connected to the wireless communication processor, and supplied with power directly from the battery, the voltage determination circuit configured to:
receive a first control signal from the wireless communication processor while the application processor is in a sleep mode,
in response to receiving the first control signal, detect a voltage of the battery while the application processor is in the sleep mode, and
output a second control signal based on the detected voltage while the application processor is in the sleep mode; and
an output device configured to output battery information based on the second control signal while the application processor is in the sleep mode,
wherein the application processor operates independently of the voltage determination circuit.

2. The electronic apparatus as claimed in claim 1, further comprising a control circuit connected to the battery in parallel with the application processor, and supplied with power directly from the battery, the control circuit configured to:
operate with the power, and
output a third control signal for driving the voltage determination circuit according to an input of a preset signal.

3. The electronic apparatus as claimed in claim 2, wherein the control circuit comprises a switch configured to be switched to an on state according to the input of the preset signal.

4. The electronic apparatus as claimed in claim 2, wherein the control circuit is configured to:
output the third control signal to indicate a remaining battery capacity.

5. The electronic apparatus as claimed in claim 1,
wherein the electronic apparatus further comprises a power key provided outside the electronic apparatus, and
wherein the power key is configured to turn on power of the electronic apparatus.

6. The electronic apparatus as claimed in claim 1, wherein the voltage determination circuit comprises a switch configured to be switched to an on state when the battery satisfies a preset voltage condition.

7. The electronic apparatus as claimed in claim 6, wherein the preset voltage condition corresponds to a condition of the detected voltage being lower than or equal to a preset voltage level.

8. The electronic apparatus as claimed in claim 1, wherein the voltage determination circuit comprises multiple switching elements that are connected in parallel to the battery, and at least one of the multiple switching elements is configured to be switched to an on state, according to multiple voltage conditions.

9. The electronic apparatus as claimed in claim 1, wherein the output device comprises at least one of a liquid crystal display (LCD), a light-emitting diode (LED), a touch screen, a speaker, or a vibration element.

10. A method for providing battery information in an electronic apparatus, the method comprising:
   receiving a first control signal from a wireless communication processor while an application processor is in a sleep mode;
   in response to receiving the first control signal, detecting a voltage of a battery while the application processor is in the sleep mode, by a voltage determination circuit connected to the battery in parallel with the application processor, connected to the wireless communication processor, and supplied with power directly from the battery; and
   outputting the battery information based on the detected voltage of the battery while the application processor is in the sleep mode,
   wherein the application processor operates independently of the voltage determination circuit.

11. The method as claimed in claim 10, further comprising:
   receiving a booting request signal and booting the electronic apparatus, by the application processor; and
   when the booting of the electronic apparatus is completed, disconnecting the voltage determination circuit connected to the battery, which is mounted on the electronic apparatus, in parallel with the application processor.

12. The method as claimed in claim 10, further comprising outputting the battery information during a warm booting state of the electronic apparatus.

13. The method as claimed in claim 10, wherein the outputting of the battery information comprises outputting the battery information by at least one of a liquid crystal display (LCD), a light-emitting diode (LED), a touch screen, a speaker, or a vibration element.

14. A method for providing battery information in an electronic apparatus, the method comprising:
   receiving a booting request signal and booting the electronic apparatus, by an application processor of the electronic apparatus;
   switching the application processor to a sleep mode when the electronic apparatus satisfies a preset sleep mode switching condition;
   determining, by a voltage determination circuit of the electronic apparatus, whether a signal is received from a wireless communication processor while the application processor is in the sleep mode;
   in response to the determination, detecting a voltage of a battery by the voltage determination circuit connected to the battery in parallel with the application processor, and supplied with power directly from the battery; and
   outputting battery information based on the detected voltage of the battery,
   wherein the application processor operates independently of the voltage determination circuit.

15. The method as claimed in claim 14, further comprising outputting the battery information of the battery during a warm booting state of the electronic apparatus.

16. The method as claimed in claim 14, wherein the outputting of the battery information comprises outputting the battery information by at least one of a liquid crystal display (LCD), a light-emitting diode (LED), a touch screen, a speaker, or a vibration element.

* * * * *